United States Patent
Jeong et al.

(10) Patent No.: US 11,340,752 B2
(45) Date of Patent: May 24, 2022

(54) WINDOW MANAGEMENT METHOD AND ELECTRONIC DEVICE SUPPORTING THE SAME

(71) Applicant: Samsung Electronics Co., Ltd., Gyeonggi-do (KR)

(72) Inventors: Hye Soon Jeong, Gyeongsangbuk-do (KR); Jun Ho Lee, Daegu (KR); Ji Hoon Jeon, Gyeongsangbuk-do (KR); Kyung Hwan Kim, Gyeonggi-do (KR); Dong Jeon Kim, Gyeonggi-do (KR); Jin Wan An, Daegu (KR); Dae Sik Hwang, Daegu (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/551,118

(22) Filed: Aug. 26, 2019

(65) Prior Publication Data
US 2019/0377459 A1   Dec. 12, 2019

Related U.S. Application Data

(63) Continuation of application No. 14/835,038, filed on Aug. 25, 2015, now Pat. No. 10,437,408.

(30) Foreign Application Priority Data

Aug. 29, 2014   (KR) .................. 10-2014-0114103

(51) Int. Cl.
G06F 3/0481   (2022.01)
G06F 3/0488   (2022.01)

(52) U.S. Cl.
CPC .......... *G06F 3/0481* (2013.01); *G06F 3/0488* (2013.01); *G06F 2203/04803* (2013.01)

(58) Field of Classification Search
CPC .............. G06F 3/0481; G06F 3/0488; G06F 2203/04803
See application file for complete search history.

(56) References Cited

U.S. PATENT DOCUMENTS 9,069,434 B1 *  6/2015  Kuscher .............. G06F 3/0486
2006/0070007 A1  3/2006  Cummins et al.
(Continued)

FOREIGN PATENT DOCUMENTS

| KR | 1020130054071 | 5/2013 |
| KR | 1020140039575 | 4/2014 |
| KR | 1020140073380 | 6/2014 |

OTHER PUBLICATIONS

Korean Office Action dated Nov. 11, 2020 issued in counterpart application No. 10-2014-114103, 14 pages.

*Primary Examiner* — Jennifer N Welch
*Assistant Examiner* — Parmanand D Patel
(74) *Attorney, Agent, or Firm* — The Farrell Law Firm, P.C.

(57) ABSTRACT

A window management method in an electronic device and an electronic device thereof are provided. The method includes displaying, on a display, a first window; displaying, on the display with the first window, a second window as a pop-up window or a split window; displaying a handler for adjusting a size of at least one of the first window and the second window at a boundary area of the first window or the second window; and changing the displayed split window into the pop-up window or the displayed pop-up window into the split window in response to a user input to the handler.

14 Claims, 23 Drawing Sheets

(56) References Cited

U.S. PATENT DOCUMENTS

| | | | |
|---|---|---|---|
| 2007/0044035 A1* | 2/2007 | Amadio | G06F 3/0481 |
| | | | 715/781 |
| 2008/0307355 A1 | 12/2008 | Yokota | |
| 2008/0313144 A1* | 12/2008 | Huston | G06F 16/951 |
| 2009/0150823 A1* | 6/2009 | Orr | G06F 3/0481 |
| | | | 715/788 |
| 2009/0265656 A1* | 10/2009 | Jetha | G06F 3/04842 |
| | | | 715/781 |
| 2011/0154248 A1 | 6/2011 | Tsuruoka | |
| 2011/0175930 A1* | 7/2011 | Hwang | G06F 3/0488 |
| | | | 345/629 |
| 2012/0084702 A1* | 4/2012 | Lee | G06F 3/0483 |
| | | | 715/776 |
| 2012/0176322 A1* | 7/2012 | Karmi | G06F 3/04883 |
| | | | 345/173 |
| 2013/0120447 A1 | 5/2013 | Kim et al. | |
| 2013/0174049 A1 | 7/2013 | Townsend et al. | |
| 2013/0311920 A1 | 11/2013 | Koo et al. | |
| 2014/0089833 A1 | 3/2014 | Hwang et al. | |
| 2014/0162787 A1 | 6/2014 | Carpenter et al. | |
| 2014/0229888 A1* | 8/2014 | Ko | G06F 3/04842 |
| | | | 715/783 |
| 2015/0199086 A1 | 7/2015 | Churchill et al. | |
| 2016/0034157 A1 | 2/2016 | Vranjes et al. | |
| 2016/0034159 A1* | 2/2016 | Vranjes | G06F 3/04842 |
| | | | 715/800 |
| 2021/0011610 A1 | 1/2021 | Hwang et al. | |

\* cited by examiner

FIG. 7B

WINDOW MANAGEMENT METHOD AND ELECTRONIC DEVICE SUPPORTING THE SAME

PRIORITY

This application is a Continuation of U.S. Ser. No. 14/835,038, which was filed in the U.S. Patent and Trademark Office on Aug. 25, 2015, and claims priority under 35 U.S.C. § 119(a) to Korean Patent Application Serial No. 10-2014-0114103, which was filed in the Korean Intellectual Property Office on Aug. 29, 2014, the entire content of each of which is incorporated herein by reference.

BACKGROUND

1. Field of the Disclosure

The present disclosure relates generally to window control, and more particularly, to outputting an output capable window in a specified form in a specified area.

2. Description of the Related Art

Electronic devices such as smartphones, display a user function management screen as a window. For example, an electronic device may provide a window relating to a video function or a web access function, through a display. If a plurality of functions is executed by the above-mentioned electronic device, the electronic device arranges a plurality of windows corresponding to the plurality of functions in a predetermined form, or stacks the plurality of windows to be placed, regardless of a user's intention regarding the arrangement of the windows. Accordingly, it is inconvenient to readjust a window position or size in order to obtain a window arrangement according to a user's intention.

SUMMARY

The embodiments described herein have been made to address at least the above problems and/or disadvantages and to provide at least the advantages described below.

Accordingly, an embodiment of the present disclosure is to provide a window management method for more easily adjusting and managing various forms of windows corresponding to a user's intention and an electronic device supporting the same.

In accordance with an embodiment of the present disclosure, an electronic device is provided. The electronic device includes a touchscreen display; and a processor configured to display, on a display area of the touchscreen display, a first execution window of a first application, display, on the display area of the touchscreen display, an application tray including a plurality of user interface (UI) items for executing applications, receive a first user input selecting a UI item from among the plurality of UI items included in the application tray and dragging the selected UI item out of the application tray, in response to the selected UI item being released within a first portion of the display area, display a second execution window of a second application corresponding to the selected UI item, together with the first execution window such that the first execution window and the second execution window are displayed side-by-side, and in response to the selected UI item being released within a second portion of the display area, display the second execution window with the first execution window, such that the first execution window and the second execution window at least partially overlap.

In accordance with another embodiment of the present disclosure, a method is provided for window management in an electronic device including a touchscreen display. The method includes displaying, on a display area of the touchscreen display, a first execution window of a first application; displaying, on the display area of the touchscreen display, an application tray including a plurality of user interface (UI) items for executing applications; receiving a first user input selecting a UI item from among the plurality of UI items included in the application tray and dragging the selected UI item out of the application tray; in response to the selected UI item being released within a first portion of the display area, displaying a second execution window of a second application corresponding to the selected UI item, together with the first execution window such that the first execution window and the second execution window are displayed side-by-side, and in response to the selected UI item being released within a second portion of the display area, displaying the second execution window with the first execution window, such that the first execution window and the second execution window at least partially overlap.

In accordance with another embodiment of the present disclosure, a method is provided for window management in an electronic device. The method includes displaying, on a display, a first window; displaying, on the display with the first window, a second window as a pop-up window or a split window; displaying a handler for adjusting a size of at least one of the first window and the second window at a boundary area of the first window or the second window; and changing the displayed split window into the pop-up window or the displayed pop-up window into the split window in response to a user input to the handler.

In accordance with another embodiment of the present disclosure, an electronic device is provided, which includes a touchscreen display; and a processor configured to display, on the touchscreen display, a first window, display, on the touchscreen display with the first window, a second window as a pop-up window or a split window, display a handler for adjusting a size of at least one of the first window and the second window at a boundary area of the first window or the second window, and change the displayed split window into the pop-up window or the displayed pop-up window into the split window in response to a user input to the handler.

BRIEF DESCRIPTION OF THE DRAWINGS

The above and other aspects, features, and advantages of the embodiments of the present disclosure will be more apparent from the following detailed description when taken in conjunction with the accompanying drawings, in which:

FIGS. 7A and 7B are diagrams illustrating a multi window with a widget window according to an embodiment of the present disclosure;

DETAILED DESCRIPTION OF EMBODIMENTS

Figure 1:
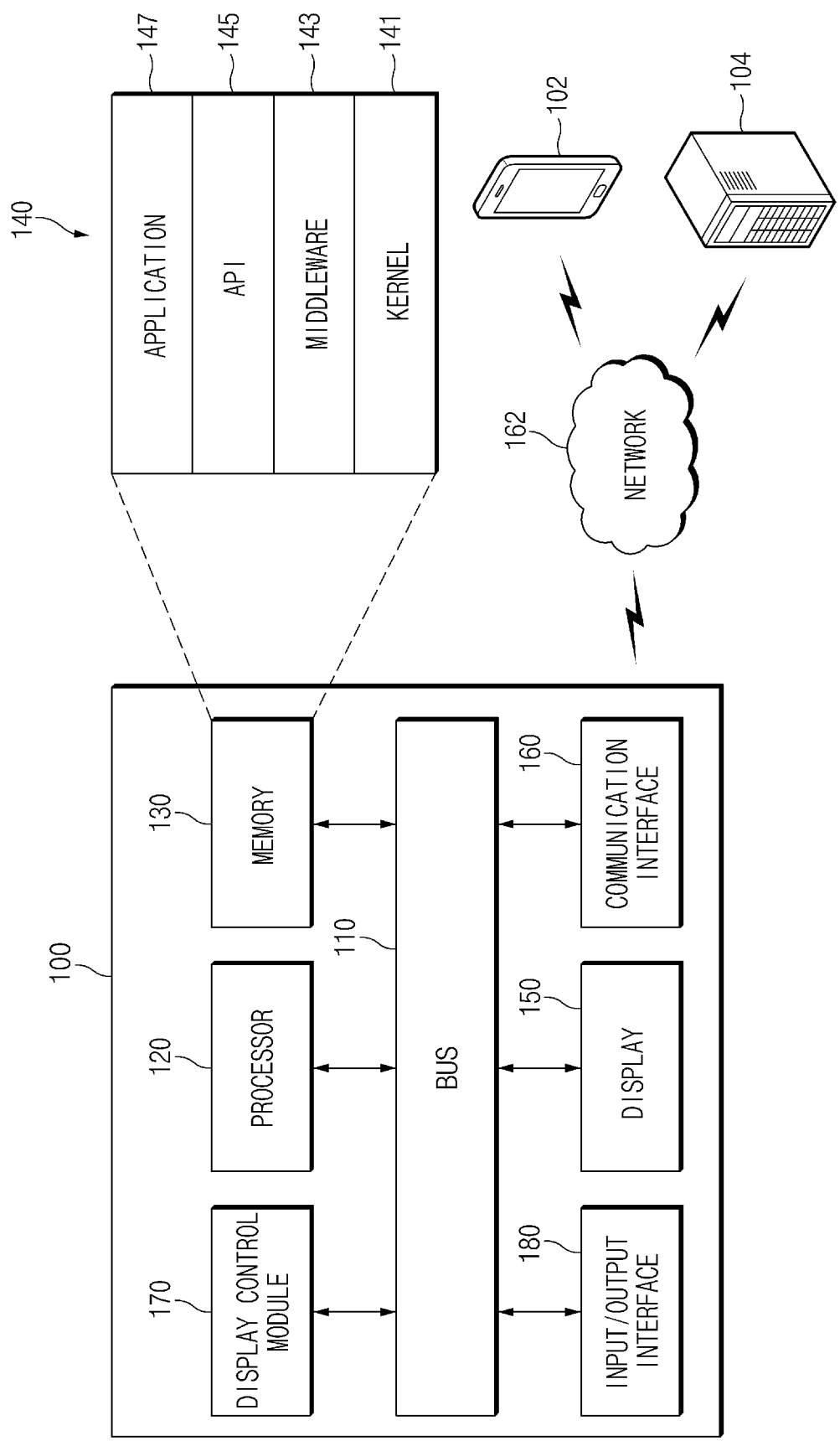
FIG. 1 is a diagram illustrating an electronic device in a network environment according to an embodiment of the present disclosure.

Embodiments of the present disclosure are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the embodiments described herein.

The terms "include," "comprise," and "have", or "may include," or "may comprise" and "may have", as used herein, indicate described functions, operations, or existence of elements but do not exclude other functions, operations or elements.

For instance, the expressions "A or B" and "at least one of A or/and B" may indicate include A, B, or both A and B. For instance, the expression "A or B", or "at least one of A or/and B" may indicate (1) at least one A, (2) at least one B, or (3) both at least one A and at least one B.

Terms such as "1st", "2nd", "first", "second", and the like, as used herein, may refer to modifying various different elements of various embodiments of the present disclosure, but do not limit the elements. Such expressions may be used to distinguish one element from another element. For instance, "a first user device" and "a second user device" may indicate different user devices regardless of the order or the importance of each device. For example, a first component may be referred to as a second component, and vice versa, without departing from the scope of the present disclosure.

It will be understood that when a component (e.g., a first component) is referred to as being "(operatively or communicatively) coupled with/to" or "connected to" another component (e.g., a second component), the component can be directly connected to the other component or connected through another component (e.g., a third component). It will be understood that when a component (e.g., a first component) is referred to as being "directly connected to" or "directly accessing" another component (e.g., a second component), a further another component (e.g., a third component) does not exist between the component (e.g., the first component) and the other component (e.g., the second component).

The expression "configured to", as used herein, may be interchangeably used with "suitable for", "having the capacity to", "designed to", "adapted to", "made to", or "capable of", for example. The term "configured to" may not necessarily mean "specifically designed to" in terms of hardware. Instead, the expression "a device configured to" perform an operation, in some situations, may mean that the device and another device or a part of the device and the another device are "capable of" performing the operation. For example, "a processor configured to perform A, B, and C" may refer to a dedicated processor (e.g., an embedded processor) for performing a corresponding operation, or a generic-purpose processor (e.g., a CPU or application processor) for performing corresponding operations by executing at least one software program stored in a memory device.

Terms used herein, may be used to describe specific embodiments of the present disclosure, and are not intended to limit the scope of other embodiments of the present disclosure. The singular form of a term may also include plural forms of the term, unless singular and plural forms have a clearly different meaning in the context. Otherwise indicated herein, all of the terms used herein, which include technical or scientific terms, may have the same definition that is generally understood by a person skilled in the art. In general, terms defined in a dictionary should be considered to have the same definition as the contextual definition of the related art, and, unless clearly defined herein, should not be understood abnormally or as having an excessively formal definition. The terms defined in this specification are not to be interpreted in a manner that excludes embodiments of the present disclosure.

According to an embodiment of the present disclosure, an electronic device may include at least one of a smartphone, a tablet personal computer (PC), a mobile phone, a video phone, an electronic book (e-book) reader, a desktop PC, a laptop PC, a netbook computer, a workstation server, a personal digital assistant (PDA), a portable multimedia player (PMP), a Motion Picture Experts Group (MPEG) audio-layer 3 (MP3) player, a mobile medical device, a camera, and a wearable device (e.g., smart glasses, a head-mounted-device (HMD), electronic apparel, an electronic bracelet, an electronic necklace, an electronic appcessory, an electronic tattoo, a smart mirror, and a smart watch).

According to an embodiment of the present disclosure, an electronic device may be a smart home appliance. A smart home appliance may include at least one of, for example, a television, a digital video disk (DVD) player, an audio device, a refrigerator, an air conditioner, an electronic cleaning device, an oven, a microwave oven, a washing machine, an air cleaner, a set-top box, a home automation control panel, a security control panel, a TV boxes (e.g., Samsung HomeSync™, Apple TV™ or Google TV™), a game console (e.g., Xbox™ and PlayStation™), an electronic dictionary, a electronic key, a camcorder, and an electronic picture frame.

According to some embodiments of the present disclosure, an electronic device may include at least one of various medical devices supporting a call forwarding service (e.g., various portable measurement devices (e.g., a glucometer, a heart rate meter, a blood pressure meter, a temperature meter, etc.), a magnetic resonance angiography (MRA) device, a magnetic resonance imaging (MRI) device, a computed tomography (CT) device, a medical imaging device, an ultrasonic device, etc.), a navigation device, a global positioning system (GPS) receiver, an event data recorder (EDR), a flight data recorders (FDR), a vehicle infotainment device, marine electronic equipment (e.g., a marine navigation system, a gyro compass, etc.), avionics, security equipment, a vehicle head unit, an industrial or household robot, financial institutions' automatic teller's machines (ATMs), or stores' point of sales (POS) or internet of things (e.g., a bulb, various sensors, an electric or gas meter, a sprinkler system, a fire alarm, a thermostat, a street light, a toaster, exercise equipment, a hot water tank, a heater, a boiler, etc.).

According to an embodiment of the present disclosure, an electronic device may include at least one of part of furniture or a building/structure supporting a call forwarding service, an electronic board, an electronic signature receiving device, a projector, and various measuring instruments (e.g., water, electricity, gas, or radio signal measuring instruments). An electronic device according to an embodiment of the present disclosure may include one of the above-mentioned various devices or a combination thereof. Additionally, an electronic device according to an embodiment of the present disclosure may be a flexible electronic device. Additionally, an electronic device according to an embodiment of the present disclosure is not limited to the above-mentioned devices, and may include a new kind of an electronic device according to technological developments.

Hereinafter, an electronic device according to an embodiment of the present disclosure is described in more detail with reference to the accompanying drawings. The term "user" in this disclosure may refer to a person using an electronic device or a device using an electronic device (e.g., an artificial intelligent electronic device).

FIG. 1 is a diagram illustrating an electronic device in a network environment according to an embodiment of the present disclosure.

Referring to FIG. 1, a network environment according to an embodiment of the present disclosure includes an electronic device 100, a network 162, an external electronic device 102, and a server device 104.

By displaying a plurality of windows (or a multi window), the electronic device 100 in the above-mentioned network environment supports output (e.g., under an environment where a plurality of windows are placed, output them in a pop-up window, a split window, or a widget window) of a plurality of windows as windows in a specified form according to at least one of: (1) a type of an event relating to an item (or an object of an icon, a thumbnail, and a text) displayed on the display 150 and (2) an event occurrence position. Herein, a window, which includes at least some elements of a screen UI output to the display 150 of the electronic device 100, may be presented in the form of a split window obtained by splitting an area of the display 150, a pop-up window output in a specified size to a specified area of the display 150, a widget window provided according to the property of an application, or an application window. According to an embodiment of the present disclosure, a window may be in the form of a webpage, an image screen, a document screen, a virtual panel, and a screen. According to an embodiment of the present disclosure, a window may be a zone or area of a specified size where information relating to at least one user function is displayed. Alternatively, a window may be a layer where information relating to at least one user function is arranged with a specified size and position.

The network 162 may include telecommunications network/For example, the telecommunications network may include at least one of a computer network (e.g., LAN or WAN), internet, and a telephone network. The network 162 may support a communication channel establishment relating to communication service management of the electronic device 100. The electronic device 100 may output at least one window relating to the use of the network 162, for example, a webpage window and a window indicating a communication connection state.

The external electronic device 102 may be the same or a different type of electronic device as the electronic device 100. The external electronic device 102 may transmit a call connection request message to the electronic device 100 via the network 162 or may establish a communication channel to request message transmission.

The electronic device 100 may output various windows relating to a communication connection with the external electronic device 102 and a data transmission/reception with the external electronic device 102. For example, the electronic device 100 may output a window relating to various communication methods for connecting to the external electronic device 102, a window indicating a communication connection state, and a window relating to the display of content received from the external electronic device 102.

The server device 104 may include a group of one or more servers. According to an embodiment of the present disclosure, all or a part of operations executed by the electronic device 100, may instead be executed on another one or more electronic devices (e.g., the electronic device 102 or the server device 104). The server device 104 may establish a communication channel with the electronic device 100 or the external electronic device 102 in relation to communication service support. According to an embodiment of the present disclosure, the server device 104 may prepare a server page and may provide the prepared server page to the electronic device 100. The electronic device 100 may output a received server page in a predetermined window form (e.g., a window for displaying a webpage, a pop-up window relating to content playback, and so on).

According to an embodiment of the present disclosure, when the electronic device 100 performs a certain function or service automatically or by a request, the electronic device 100 may request at least part of a function relating thereto from another device 102 or 10 instead of or in addition to executing the function or service by itself. The other electronic device 102 or 104 may execute the requested function or an additional function and may deliver a result of execution of the function to the electronic device 100. The electronic device 100 may provide the requested function or service by processing the received result as it is or additionally. For example, the electronic device 100 may output the received result to the display or the electronic device 100 may perform a specific processing with the received result and output the processed received result. For this, for example, cloud computing, distributed computing, or client-server computing technology may be used.

The electronic device 100 includes a bus 110, a processor 120, a memory 130, an input/output interface 180, a display 150, a communication interface 160, and a display control module 170. According to an embodiment of the present disclosure, the electronic device 100 may omit at least one of the components or may additionally include at least one different component.

The bus 110 of the electronic device 100, for example, may include a circuit for connecting the above-mentioned components 110 to 170 to each other and delivering a communication (e.g., a control message and/or data) between the components. For example, the bus 110 may deliver an input event relating to execution of a user function to at least one of the display control module 170 and the processor 120. The bus 110 may deliver window data to be output to the display 150 corresponding to a control of the display control module 170. According to an embodiment of the present disclosures, when a touch event relating to a multi window output (e.g., a window output in an environment in which a plurality of windows are placed) is received from the display 150 for supporting a touch function, the bus 110 may deliver this touch event to the display control module 170.

The processor 120 may include at least one of an Application Processor (AP), a communication processor (CP), and a central processing unit (CPU). The processor 120, for example, may execute calculation or data processing for control and/or communication of at least one another component of the electronic device 100. According to an embodiment of the present disclosure, the processor 120 may perform data processing or control signal processing relating to execution of at least one application. According to an embodiment of the present disclosure, the processor 120 may perform calculation processing relating to the management of program modules loaded into the memory 130. The processor 120 may perform calculation relating to window output adjustment, conversion, and so on corresponding to an event occurrence by supporting the management of the display control module 170.

The memory 130 may include volatile and/or nonvolatile memory. The memory 130, for example, may store instructions or data relating to at least one another component of the electronic device 100. The memory 130 may store software and/or programs. The memory 130 includes a kernel 141, a middleware 143, an application programming interface (API) 145, and an application program (or an application) 147. At least part of the kernel 141, the middleware 143, or the API 145 may be called an operating system (OS).

The kernel 141, for example, control or manages system resources (e.g., the bus 110, the processor 120, the memory 130, and so on) used for performing operations or functions implemented in other programs (e.g., the middleware 143, the API 145, or the application program 147). Additionally, the kernel 141 provides an interface for controlling or managing system resources by accessing an individual component of the electronic device 101 from the middleware 143, the API 145, or the application program 147. According to an embodiment of the present disclosure, the kernel 141 may support the allocation of a memory relating to a multi window output, a data output of the display 150, and a change of data output.

The middleware 143, for example, may serve as an intermediary role for exchanging data as the API 145 or the application 147 communicates with the kernel 141. Additionally, in relation to job requests received from the application program 147, the middleware 143, for example, may perform a control (e.g., scheduling or load balancing) for the job requests by using a method of assigning a priority for using a system resource (e.g., the bus 110, the processor 120, the memory 130, and so on) of the electronic device 101 to at least one application program among the application programs 147. According to an embodiment of the present disclosure, the middleware 143 may deliver information relating to at least one window output to the kernel 141 and may support an API call relating to an input event reception relating to a multi window output and an API call relating to a plurality of window outputs corresponding to a received input event.

The API 145 is an interface that allows the application 147 to control a function provided from the kernel 131 or the middleware 132, an may include at least one interface or function (e.g., an instruction) for file control, window control, image processing, or character control. According to an embodiment of the present disclosure, the API 145 may include an API relating to a window to be output for each selected user function, an API relating to input event processing, and an API relating to multi window processing.

The input/output interface 180, for example, serves as an interface for delivering instructions or data inputted from a user or another external device to another component(s) of the electronic device 100. Additionally, the input/output interface 180 outputs instructions or data received from another component(s) of the electronic device 100 to a user or another external device. According to an embodiment of the present disclosure, the input/output interface 180 may include a key button and a keypad for selecting at least one item displayed on the display 150.

Additionally, the input/output interface 180 may include an audio processing module. The audio processing module may output specified audio data relating to multi window management. For example, the audio processing module may differently output audio data when a window output in relation to specific function execution is output as a pop-op window and audio data when it is output as a split window.

According to an embodiment of the present disclosure, the input/output interface 180 may further include a vibration module and a lamp module. At least one of a vibration pattern of a vibration module or a flashing color or flashing pattern of a lamp module may be applied diversely (or separately), in a manner that corresponds to the form (e.g., a window type or a window form in an environment in which a plurality of windows are placed) of a window output.

The display 150, for example, may include a liquid crystal display (LCD), a light emitting diode (LED) display, an organic light emitting diode (OLED) display, a microelectromechanical systems (MEMS) display, or an electronic paper display. The display 150 may display various content (e.g., text, image, video, icon, symbol, etc.) to a user. The display 150 may include a touch screen, and for example, may receive a touch, gesture, proximity, or hovering input by using an electronic pen or a user's body part.

According to an embodiment of the present disclosure, the display 150 may output at least one window. For example, the display 150 may output a window corresponding to a user function specified by an input event or a function executed by scheduling. According to an embodiment of the present disclosure, the display 150 may output a window tray relating to multi window function support. When an item is selected from the window tray or an item is selected while a specific window is inputted, the display 150 may output a window relating to a corresponding item. During this operation, the display 150 may output the form (e.g., a window form in an environment in which a plurality of windows is placed) of a window output that newly corresponding to an event in at least one of a pop-up window, a split window, and a widget window.

The communication interface 160, for example, sets communication between the electronic device 100 and an external device (e.g., the electronic device 102 or the server device 104). For example, the communication interface 160 may communicate with an external device (e.g., the external electronic device 102 or the server device 104) that is connection to the network 162, through wireless communication (or short range wireless communication) or wired communication. The wireless communication may use long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM) as a cellular communication protocol, for example. The wired communication, for example, may include at least one of universal serial bus (USB), high definition multimedia interface (HDMI), recommended standard 232 (RS-232), and plain old telephone service (POTS). The short range wireless communication may include a communication method based on a Bluetooth communication module, a WiFi direct communication module, etc. At least one window may be output to the display 150 corresponding to the management of the communication interface 160. An additionally output window form may vary according to an event relating to at least one item (or object) included in the output window.

The display control module 170 controls a window output of the electronic device 100. According to an embodiment of the present disclosure, the display control module 170 may perform a control to differently output a window form corresponding to at least one of a movement direction, movement speed, movement distance, and movement area (or movement position) of an item selected by an event. Alternatively, the display control module 170 may perform a control to differently output a window form corresponding to the form (e.g., tap, double tap, multi tap, pinch zoom or pinch out, long touch, and so on) of an event relating to the selected (or indicated) item. For example, the display control module 170 may perform a control to output at least one a pop-up window and a split window corresponding to an event form. Alternatively, the display control module 170 may output a widget window corresponding to an event. According to an embodiment of the present disclosure, the display control module 170 may differently output at least one of the size, position, and form of a pop-up window (or at least one of a split window and a widget window) corresponding to an event form. According to an embodiment of the present disclosure, the display control module 170 may output a window tray or a recent execution list when a window is output corresponding to a specific function execution.

When at least one item is selected from a window tray or a recent execution list, the display control module 170 may output guide information corresponding to the selected item. Guide information, for example, may include at least one of an image and text corresponding to a pop-up window, split window, or widget window corresponding to the selected item, in an environment in which a plurality of windows are output on the display 150 by the selected item. When the selected item is placed in an area where a pop-up window image, a split window image, or a widget window image is displayed, the display control module 170 may output a preview image (e.g., a thumbnail, icon, or text relating to the selected item) corresponding to the position area. When a specified event (e.g., a touch release event) relating to the selected item occurs, the display control module 170 may output a window (e.g., a pop-up window, a split window, or a widget window) corresponding to a position area.

Figure 2:
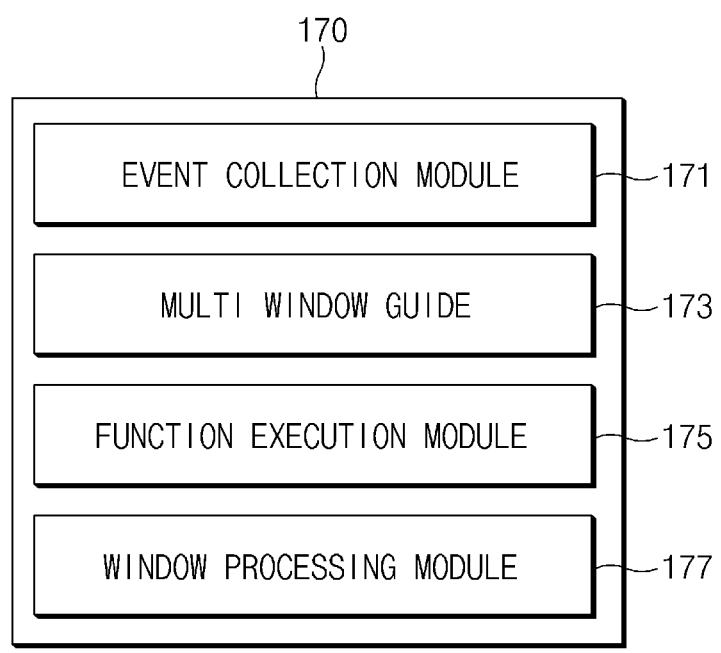
FIG. 2 is a diagram illustrating a configuration of a display control module according to an embodiment of the present disclosure.

FIG. 2 is a diagram illustrating a configuration of a display control module according to an embodiment of the present disclosure.

Referring to FIG. 2, the display control module 170 includes an event collection guide 173, a function execution module 175, and a window processing module 177.

The event collection module 171 collects an event occurring from the input/output interface 180 or the display 150 of a touch function. According to an embodiment of the present disclosure, the event collection module 171 may collect an event relating to a multi window function setting, an event relating to a window tray output or removal, etc. According to an embodiment of the present disclosure, the event collection module 171 may collect an event relating to the selection of an item (e.g., an item displayed when a specific window is output, an item placed on a window tray, an item placed on a recent execution list, and so on) relating to a multi window and an event relating to the movement of a selected item. When a specified event relating to an item occurs, the event collection module 171 delivers the specified event to at least one of the multi window guide 173, the function execution module 175, and the window processing module 177. According to an embodiment of the present disclosure, if there is a multi window function setting, the electronic device 100 may output a window relating to a selected item in full screen.

According to an embodiment of the present disclosure, when an event for selecting an item occurs, the event collection module 171 may check an event type. For example, the event collection module 171 may check a tap (or double) touch event, a long touch event, a swap event, and a pinch event, which occur on an item displayed on the display 150 by analyzing a collected event. The event collection module 171 may deliver, to a related module, information relating to an event type or an event occurrence position. For example, when an event (e.g., a long touch event or a tap event) relating to the multi window guide 173 is collected, the event collection module may deliver this to the multi window guide 173. Alternatively, when an event (e.g., a double tap touch event or a pinch event) relating to a function execution is collected, the event collection module may deliver this to the function execution module 175. Alternatively, when an event (e.g., a swap event or a drag event) relating to a window adjustment is collected, the event collection module 171 may deliver the collected event to the window processing module 177.

The multi window guide 173 controls the output of a window tray (e.g., a tray where an item relating to at least one function execution is placed). For example, the multi window guide 173 may provide at least one setting (e.g., an icon or menu relating to a window tray output, a key button allocation, and so on) relating to a window tray output. When an event (e.g., a window tray icon, menu, or key button selection event) relating to a setting occurs, the multi window guide 173 may perform a control to output a window tray to the display 150. According to an embodiment of the present disclosure, the multi window guide 173 controls a recent execution list output according to a specified event occurrence in order to output a plurality of windows to the display 150. When an item included in the recent execution list is selected, the multi window guide 173 controls guide information input relating to the selected item.

The multi window guide 173 controls guide information to be output. For example, when a notification relating to a specified event occurrence is received from the event collection module 171, the multi window guide 173 may output specified guide information to the display 150. According to an embodiment of the present disclosure, the multi window guide 173 may output guide information for changing the display form of a predetermined area on the display 150 according to an item selection included in a window tray or a recent execution list. For example, the multi window guide 173 may output, as guide information, an image illustrating the form of a window output to a specified area of the display 150, for example, area information set to be output in a pop-up window form, area information set to be output in a split window form, and so on. When at least part of a selected item overlaps another window, due to movement of a selected item, an area where the selected item overlaps the other window may be highlighted, or at least one of the color, contrast, saturation, and transparency of a specified area may be changed and displayed. Alternatively, the multi window guide 173 may output a thumbnail relating to a selected item or a specified image as guide information corresponding to the area where the selected item overlaps the other window.

According to an embodiment of the present disclosure, the multi window guide 173 may output guide information including at least one of a text and image relating to a specified window form. For example, the multi window guide 173 may output, as guide information, the manipulation information (e.g., at least one of a text and an image) of the electronic device 100 necessary for outputting at least one of a pop-up window, a split window, and a widget window in relation to the selected item. According to an embodiment of the present disclosure, the multi window guide 173 may output, as guide information, at least one of text information indicating various sizes of a window and arrangement information of a plurality of windows.

When a specific event occurrence related to the selected item is received from the event collection module 171, the multi window guide 173 may remove output guide information. For example, if a specified gesture event occurs during an output of the guide information, the multi window guide 173 may remove at least part of output guide information from display. Alternatively, the window guide 173 may perform a control to return to a previous item selection state (e.g., a state in which a window tray or a recent execution list is output or a state that a specific window before a window tray or a recent execution list is output).

According to an embodiment of the present disclosure, the multi window guide 173 may change guide information corresponding to an event delivered from the event collection module 171. For example, when an event (e.g., a drag event) relating to a size adjustment is received, the multi window guide 173 may change the size of guide information that is currently output. Alternatively, the multi window guide 173 may adjust (e.g., reduce or increase the size of an output image) at least one of a text or image included in guide information corresponding to an event.

According to an embodiment of the present disclosure, when an event relating to a specific item execution is received, the function execution module 175 may execute a function set in a corresponding item. The function execution module 175 may provide a window corresponding to a function execution to the window processing module 177. When a multi window is output to the multi window display 150, the function execution module 175 may control a function execution relating to at least one window. According to an embodiment of the present disclosure, the function execution module 175 may control a function execution relating to a focused window (e.g., a window specified for input event processing). Alternatively, the function execution module 175 may process a function relating to an unfocused window in background processing. The function execution module 175 may control a corresponding function execution according to an event that the event collection module 171 delivers. The function execution module 175 may deliver information corresponding to a function execution to the window processing module 177. During this operation, the function execution module 175 may deliver function execution information including window identification information to the window processing module 177.

According to an embodiment of the present disclosure, the window processing module 177 may perform window processing according to the function execution information delivered from the function execution module 175. For example, the window processing module 177 may receive function execution information relating to a function specified by an input event or a function selected corresponding to preset job scheduling. The window processing module 177 may create a window relating to a corresponding function execution information output. Alternatively, the window processing module 177 may update the created window corresponding to function execution information. During this operation, the window processing module 177 may check window identification information included in function execution information and may update a corresponding window.

According to an embodiment of the present disclosure, when function execution information relating to a new window is received from the function execution module 175, the window processing module 177 may create a new window. The window processing module 177 may determine the output form of the new window according to an event that the event collection module 171 delivers. For example, the window processing module 177 may output a window to be output as a pop-up window or a split window corresponding to an event. Alternatively, the window processing module 177 may adjust at least one of the size and position of a specified pop-up window (or a split window) corresponding to an event. According to an embodiment of the present disclosure, the window processing module 177 may receive function execution information according a widget execution from the function execution module 175. The window processing module 177 may create a widget window according to the received function execution information and may output this to the display 150.

According to an embodiment of the present disclosure, the window processing module 177 may adjust the display form of function execution information corresponding to a window form to be output. For example, the window processing module 177 may adjust the amount or size of function execution information to be output or the arrangement position of information corresponding to a window form (or size) to be output. According to an embodiment of the present disclosure, the window processing module 177 may adjust the form (e.g., size or position) of a window to be output corresponding to an event. Alternatively, the window processing module 177 may change the form of a window being output currently corresponding to an event.

As mentioned above, according to an embodiment of the present disclosure, an electronic device may include a display for displaying at least one item and a display control module for processing an output capable window form to be output as a specified form in an environment where a plurality of windows are output when a window is output corresponding to the item selection event. According to an embodiment of the present disclosure, the output capable window may be displayed or may not be displayed corresponding to the user input. According to an embodiment of the present disclosure, the output capable window may be a preview window corresponding to a window output on the display. The output capable window may just not be a displayed window yet.

According to an embodiment of the present disclosure, the display control module may be set to output a window tray or recent execution list including at least one item according to an input event occurrence, on a specific window.

According to an embodiment of the present disclosure, the display control module may be set to output a window relating to the item as at least one of a pop-up window, a split window, and a widget window corresponding to a movement area of the selected item.

According to an embodiment of the present disclosure, the display control module may be set to display guide information of an output capable at least one window form in relation to the selected item.

According to an embodiment of the present disclosure, the display control module may be set to remove the guide information corresponding to a specified event occurrence.

According to an embodiment of the present disclosure, the display control module may be set to display guide information of an output capable window form according to a movement position of the selected item.

According to an embodiment of the present disclosure, as a specified event occurrence is received while the selected item is placed on guide information, the display control module may be set to output a window including information corresponding to an application execution relating to the selected item in a window form corresponding to the guide information.

According to an embodiment of the present disclosure, the display control module may be set to output a window relating to the item as at least one of a pop-up window, a split window, and a widget window corresponding to the guide information of the moved position.

According to an embodiment of the present disclosure, the display control module may be set to output at least one item including at least one virtual button relating to at least one multi window form.

According to an embodiment of the present disclosure, the display control module may be set to differently output a window form corresponding to the type of a selected virtual button.

According to an embodiment of the present disclosure, the display control module may be set to adjust at least one of the form and size of an output capable window corresponding to the event type.

According to an embodiment of the present disclosure, an electronic device may include a memory for storing at least one item and a window to be output in relation to the at least one item and a display control module connected to the memory. The display control module prepares an environment in which a plurality of windows are output corresponding to an item selection event displayed in a display area and may process an output capable window form to be output as a specified form in a specified area.

According to an embodiment of the present disclosure, an electronic device may include a memory for storing at least one item and at least one instruction set to output a window relating to the at least one item and a display control module for processing the at least one item or the window to be output corresponding to the instruction execution in connection to the memory. The instruction executed by the display control module may include an instruction set to display at least one item in a display area, an instruction set to prepare an environment in which a plurality of windows corresponding to the displayed item selection event, and instructions set to output the output forms of output capable windows as a specified form in a specified area in relation to the item.

Figure 3:
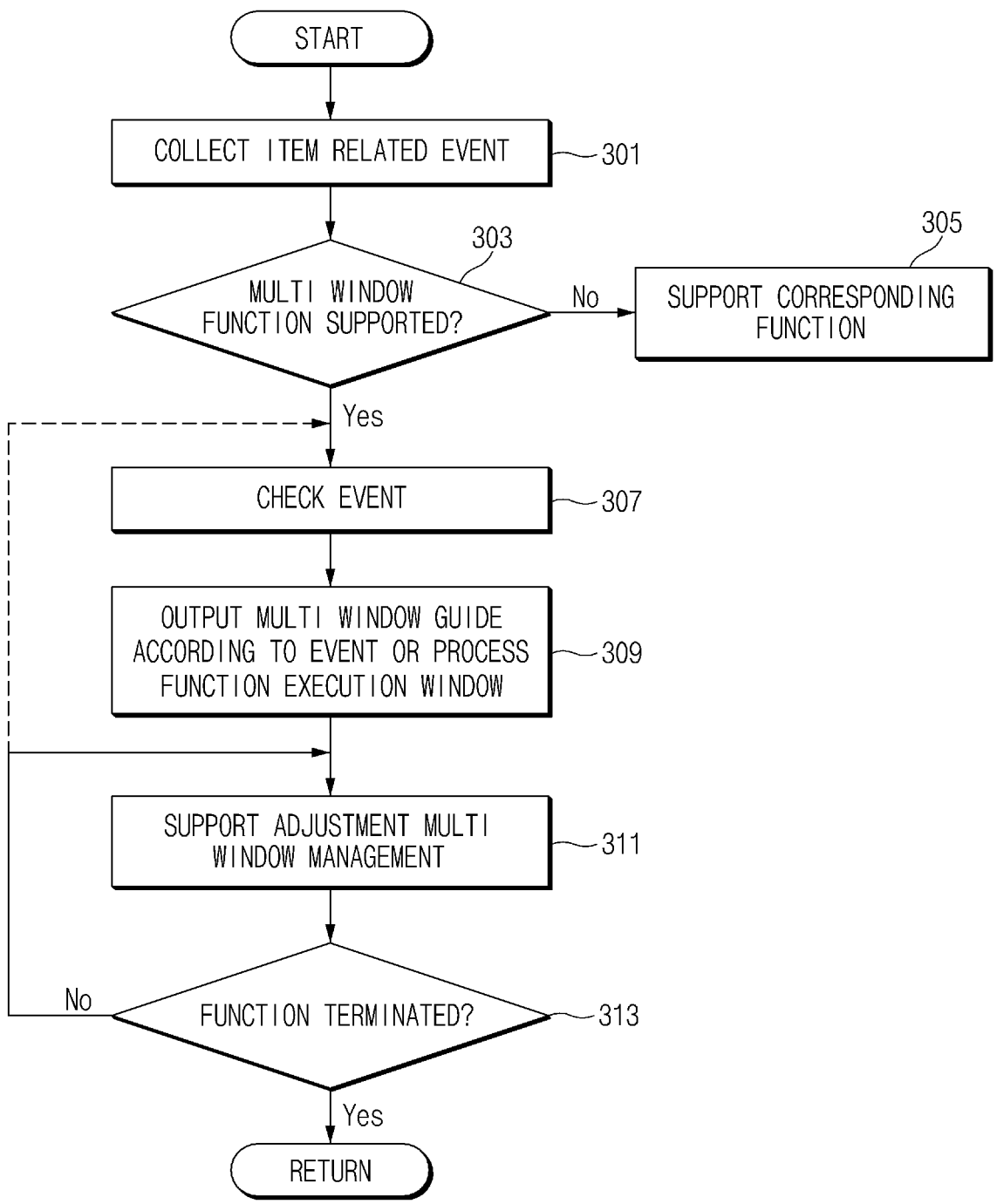
FIG. 3 is a flowchart illustrating a window management method according to an embodiment of the present disclosure.

FIG. 3 is a flowchart illustrating a window management method according to an embodiment of the present disclosure.

Referring to FIG. 3, in relation to a window management method according to an embodiment of the present disclosure, the display control module 170 receives an item related event (e.g., a touch event), in operation 301. In relation to collecting an item related event, the display control module 170 may output at least one item to the display 150 and may collect an event relating to an item control (e.g., an item selection, an item movement, and so on). According to an embodiment of the present disclosure, the display control module 170 may provide a window tray (or a recently executed application list or a multi tasking list) including at least one item. The window tray may be output to a home screen or a standby screen, or may be output according to an input event occurrence. According to an embodiment of the present disclosure, while a window corresponding to a function execution is output, the window tray may be output to a specified area of the display 150 corresponding to an input event.

In operation 303, the display control module 170 checks whether there is a setting relating to a multi window function support or an input event relating to a multi window function support. For example, the display control module 170 checks whether an event collected, in operation 301 is an event relating to an item placed in a window tray. If the display control module does not support a multi window function, the display control module 170 supports a function execution corresponding to an item related event, in operation 305. For example, the display control module 170 may execute an item related function and may output a corresponding function execution screen to the display 150 in full screen. Alternatively, the display control module 170 may support the position movement of a corresponding item corresponding to an item related event.

If there is a setting for supporting a multi window function or an input event relating to a multi window function execution, the display control module 170 checks the type, position, or form of an event that has occurred, in operation 307. For example, the display control module 170 may check at least one of the type (e.g., a touch down event, a tap event, a long touch event, a swap event, a drag event, and so on) of an event, the position on the display 150 where an event occurs, and the gesture form of an event.

In operation 309, the display control module 170 performs a multi window guide output or perform window processing corresponding to an event.

According to an embodiment of the present disclosure, if an event type is an item selection related event, the display control module 170 may provide a preview function of a window form to be output. For example, when selecting an item (e.g., an icon, a thumbnail, and so on), the display control module 170 may provide, as a preview, a window form to be displayed according a position where a corresponding item related window is placed. The preview function may be provided or may not be provided corresponding to a setting. Alternatively, the preview function may be provided when a selected item is placed at a specified predetermined position.

According to an embodiment of the present disclosure, when the selected item is placed at a specified area, the display control module 170 may output a window (e.g., at least one of a pop-up window, a split window, and a widget window) corresponding a specified area. Alternatively, when a specified event (e.g., a touch release event) occurs in a state in which the selected item is placed at a specified area, the display control module 170 may output a window of a specific form corresponding to the selected item. According to an embodiment of the present disclosure, the display control module 170 may determine an application to be executed corresponding to the position of the selected item. For example, when the selected item is placed at a position to be output as a pop-up window or a split window, the display control module 170 may perform a control to execute a function application. When the selected item is placed at a position to be output as a widget window, the display control module 170 may perform a control to execute a widget application.

According to an embodiment of the present disclosure, the display control module 170 may output guide information for selecting a window form according an event type. For example, when event for selecting a plurality of items (e.g., a drag event that draws an area including a plurality of items in an area where a plurality of items are displayed) occurs, the display control module 170 may output guide information for selecting a window form for each of the plurality of items. Alternatively, when an event relating a window tray call occurs, the display control module 170 may output guide information for selecting a window form for at least one item included in a window tray. According to an embodiment of the present disclosure, when an event (e.g., a home key related input signal) for requesting a search with respect to all windows in execution occurs, the display control module 170 may output window-specific guide information for each window on a search window (e.g., a recent execution list or a multi tasking list). According to an embodiment of the present disclosure, the display control module 170 may output each window specific guide information to a specified position or an area other than a search window. When a specific item is selected on a search window, the display control module 170 may output guide information for selecting the window form of the selected item.

According to an embodiment of the present disclosure, the display control module 170 may check the number of items included in a search window. The display control module 170 may provide the guide information differently according to the number of items. For example, when two items are included in a search window, the display control module 170 may output guide information including a pop-up window image and a split window image. For example, when three items are included in a search window, the display control module 170 may output guide information including a pop-up window image, a split window image, and a widget window image. Alternatively, when four items are included in a search window, the display control module 170 may output guide information including three pop-up window images and a split window image. As mentioned above, according to the number of items included in a search window, the display control module 170 may output guide information including at least one pop-up window image, at least one split window image (e.g., dividing a display area to be smaller to correspondence to the number and allocating it in order for a plurality of area divisions), and at least one widget window image.

According to an embodiment of the present disclosure, the guide information, for example, may include at least one of a virtual button (or a shortcut button or a shortcut tap) for selecting a pop-up window form, a virtual button for selecting a split window form, and a virtual button for selecting a window form. Alternatively, the guide information may include at least one virtual button corresponding to the type of function executed according to an item. According to an embodiment of the present disclosure, when an item related function supports only a pop-up window form (or at least one of a widget window form and a split window form), guide information relating to a corresponding item may include a virtual button relating to a pop-up window (or a widget window form or a split window form).

According to an embodiment of the present disclosure, the display control module 170 may output a handler for adjusting at least one of the size and position of a window corresponding to an event. When an event corresponding to a handler manipulation occurs, the display control module 170 may adjust at least one of the size and position of a window according to a handler manipulation event. According to an embodiment of the present disclosure, the display control module 170 may change the form of a window according to a handler manipulation. For example, the display control module 170 may change a split window into a pop-up window or a pop-up window into a split window according to a handler manipulation.

According to an embodiment of the present disclosure, the display control module 170 may remove guide information or at least one window of a multi window corresponding to an event. According to an embodiment of the present disclosure, when a specified gesture event occurs in a state in which guide information is output, the display control module 170 may remove guide information being output. According to an embodiment of the present disclosure, when a specified gesture event occurs in a state in which a multi window is output, the display control module 170 may remove at least one (e.g., the most recently created window or the oldest window) of window of the multi window.

In operation 311, the display control module 170 performs multi window management support. For example, the display control module 170 may support a function execution relating to at least one window of a multi window. According to an embodiment of the present disclosure, the display control module 170 may support page switching to a specified window according to an input event occurrence. Alternatively, the display control module 170 may change a focused window according to an input event occurrence.

In operation 313, the control module 170 checks whether there is an event occurrence relating to a function termination. If there is no function termination related event occurrence, the control module 170 branches into operation 311 or operation 307 in order to perform the subsequent operations again corresponding to a program design. According to an embodiment of the present disclosure, when an event that has occurred is not a function termination related event, the display control module 170 may process this as a multi window management related event.

According to an embodiment of the present disclosure, when the event that has occurred is not the function termination related event, the display control module 170 branches into operation 307 to check the event that has occurred and performs operation 309 again. For example, when an additional or alternative item selection event occurs, in an environment in which a multi window is output, the display control module 170 may output guide information selectable based on a selected item and may process a window application relating to the selection of the guide information by an event that occurs later. During this iteration of operation 309, the display control module 170 may replace a window created by an item related function execution with at least one of a multi window being currently output or may add the created window to the multi window. The display control module 170 may adjust a new window form that is replaced or added differently according to an event. When the event that has occurred is the function termination related event, the display control module 170 may terminate a multi window function and may process a specified function return. For example, the display control module 170 may return to a standby or a home screen or may output at least one window of a multi window to the display 150 in full screen.

Figure 4A:
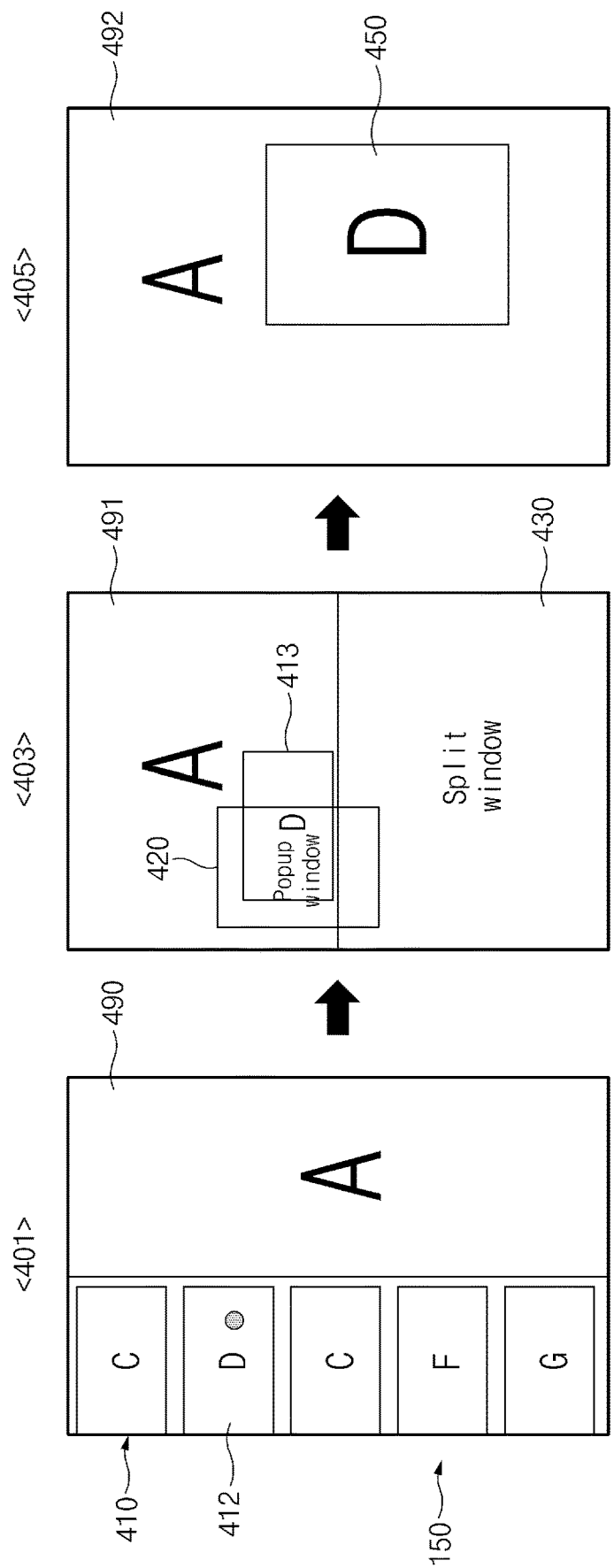
FIGS. 4A and 4B are diagrams illustrating a movement event based multi window form according to an embodiment of the present disclosure.
Figure 4B:
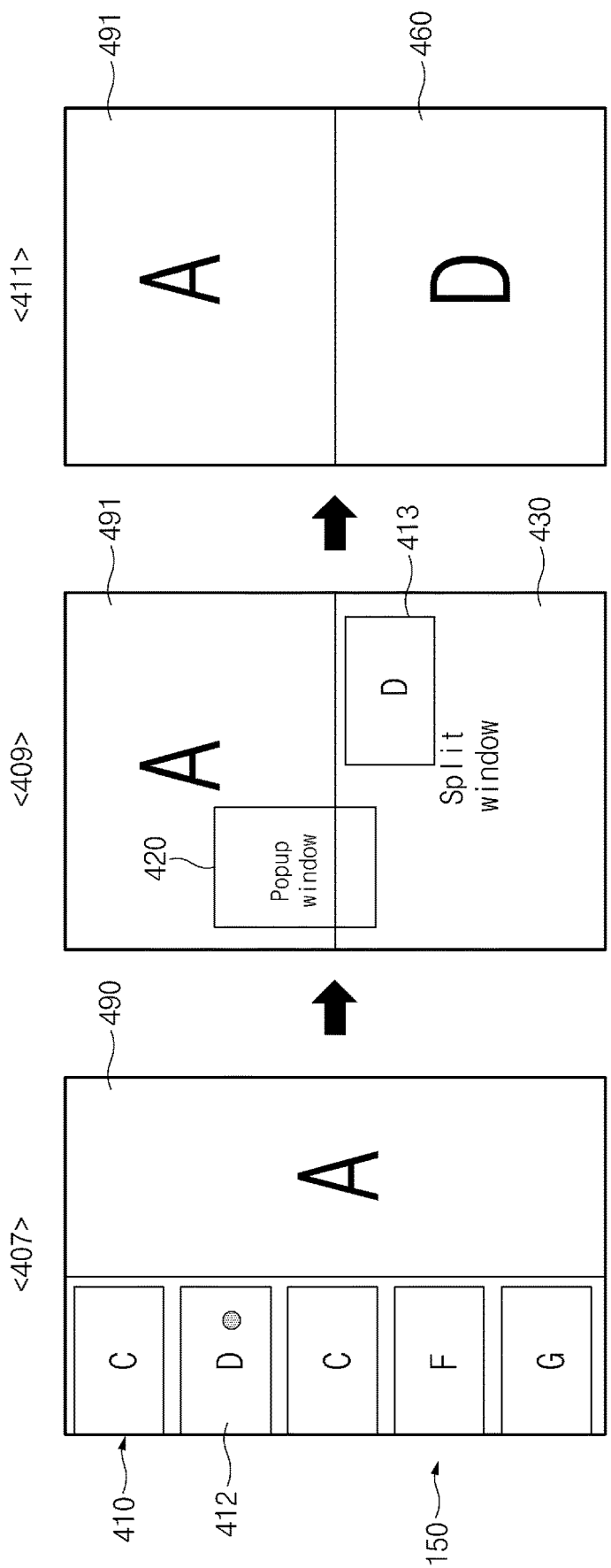

FIGS. 4A and 4B are diagrams illustrating a movement event based multi window form according to an embodiment of the present disclosure.

Referring to FIG. 4A, the display control module 170 of the electronic device may control a specified function execution according to predetermined information or an input event in order to execute a given specific function. The display control module 170 outputs a window 490 created according to a specified function execution to the display 150, as shown in state 401. The window 490 may be, for example, a music playback window, a video playback window, a webpage window, a message function related window, a document function related window, etc.

According to an embodiment of the present disclosure, the display control module 170 outputs a window tray 410 (e.g., a window tray relating to a multi window output, or an app tray or app list including items corresponding to a recently executed application) according to an input event occurrence. The window tray 410 may be placed in a predetermined area of the display 150, for example, the left area of the display 150. Alternatively, the window tray 410 may be output to another position. Alternatively, the window tray 410 may change its position according to a user manipulation. For example, the window trays 410 may be respectively placed at the left and right of the display 150. The window tray 410 may include at least one item. For example, the window tray 410, for example, may include an item relating to at least one function of a music playback function, a video playback function, a broadcast content display function, a voice search function, a voice recording function, a scheduler or calendar function, a call function, a web surfing function, a clock function, an alarm function, a message function, an e-mail function, a chatting function, a file search function, a phone book function, a gallery function, a calculator function, etc.

The display control module 170 collects an event for selecting an item 412 from the window tray 410. The display control module 170 outputs at least one of first guide information 420 and second guide 430, as shown in state 403 according to an event occurrence. The first guide information 420 indicates that a window of a function executed in relation to the selected item 412 may be output in a pop-up window form. The second guide information 430 indicates that a window of an executed function in relation to the selected item 412 may be output in a split window form. In relation to the display of the second guide information 430 in relation to a split window, the display control module 170 may output a window 491 obtained by modifying a window 490 to the display 150. The window 491, for example, is a window that is adjusted to a predetermined size according to the second guide information 430.

The display control module 170 outputs an item 413 corresponding to an event (e.g., a drag event) relating to the selected item 412. The item 413, for example, may include an image or text of a form similar to that of the item 412. According to an embodiment of the present disclosure, the item 413 may be an image obtained by adjusting the transparency of the selected item 412. The item 413 may change its displayed position according to an event occurrence. When the item 413 overlaps the first guide information 420 as shown in state 403, the guide information 420 may be changed according to the overlapping with the item 413. For example, the first guide information 420 overlapping the item 413 may change at least one of its color, contrast, and size.

If a specified event (e.g., a drag event release) occurs while the item 413 overlaps the first guide information 420, the display control module 170 outputs a window corresponding to a function execution of the item 412 as a pop-up window 450 corresponding to the first guide information 420, as shown in state 405. While outputting the pop-up window 450, the display control module 170 changes the window 491 to window 492. According to an embodiment of the present disclosure, the display control module 170 may maintain a state of the window 490 in states 401, 403, and 405. In this case, the display control module 170 may overlap the guide information 430 and the window 490 and output them in state 403. The display control module 170 may display the first guide information 420 on the window 490 in an overlay form.

Referring to FIG. 4B, the display control module 170 may output a screen shown in state 407 to the display 150, which corresponds to an occurrence of an input event or execution of a job-scheduled task set in the electronic device 100. For example, as shown in FIG. 4B, the display control module 170 outputs the window 490 to the display 150 and displays the window tray 410 on the window 490 in an overlay form.

The display control module 170 outputs the item 413 shown in state 409 to the display 150, as the item 412 shown in state 407 is selected and then moved. During this operation, when the item 413 is placed on the guide information 430, the display control module 170 may adjust the display form of the item 413 or the guide information 430. For example, the display control module 170 may change at least one of the color, contrast, and size of the item 413 or the guide information 430.

If a specified event (e.g., a drag release event) occurs while the item 413 is overlaid on the guide information 430, the display control module 170 outputs a function execution window corresponding to the item 412 as a split window 460 in the area of the guide information 430, as shown in state 411. During this operation, the display control module 170 outputs the window 491 in addition to the split window 460. In state 409, the display control module 170 may output the guide information 430 and maintain the window 490 without outputting the window 491. The window 490 may change into the window 491 when a split window corresponding to the item 412 is output.

Figure 5A:
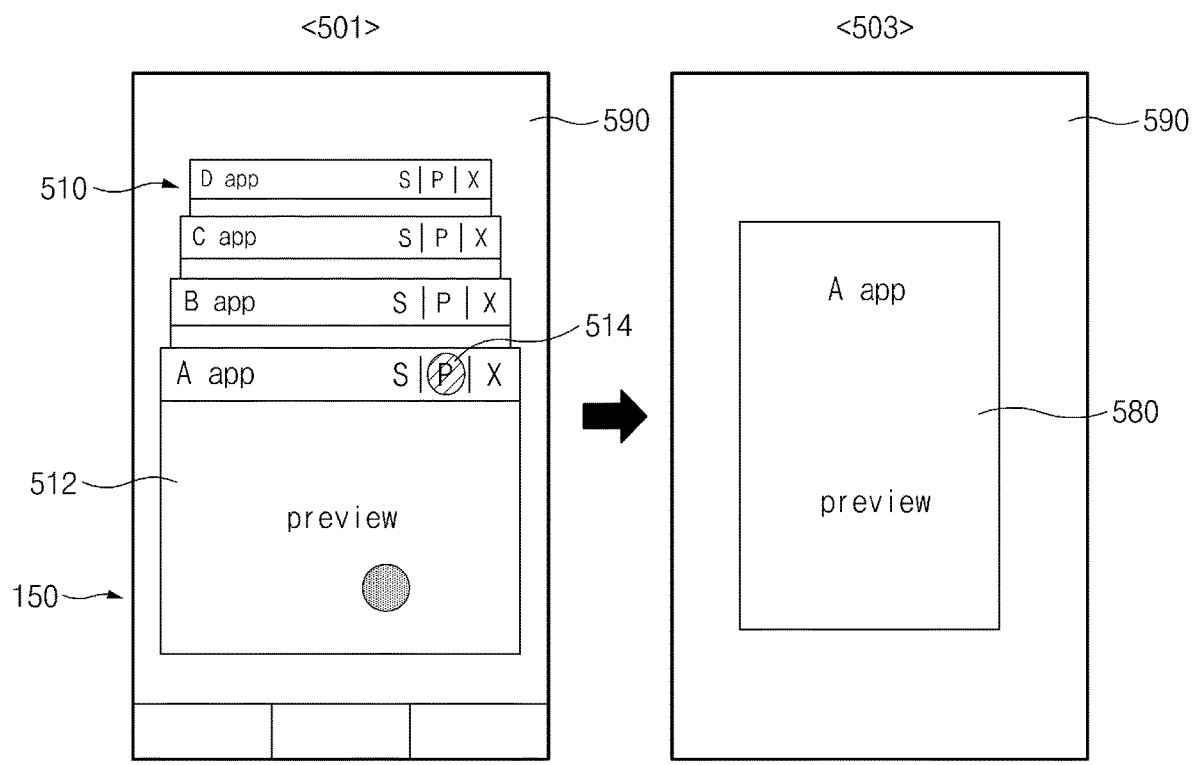
FIGS. 5A to 5F are diagrams illustrating a selection event based multi window form according to an embodiment of the present disclosure.
Figure 5B:
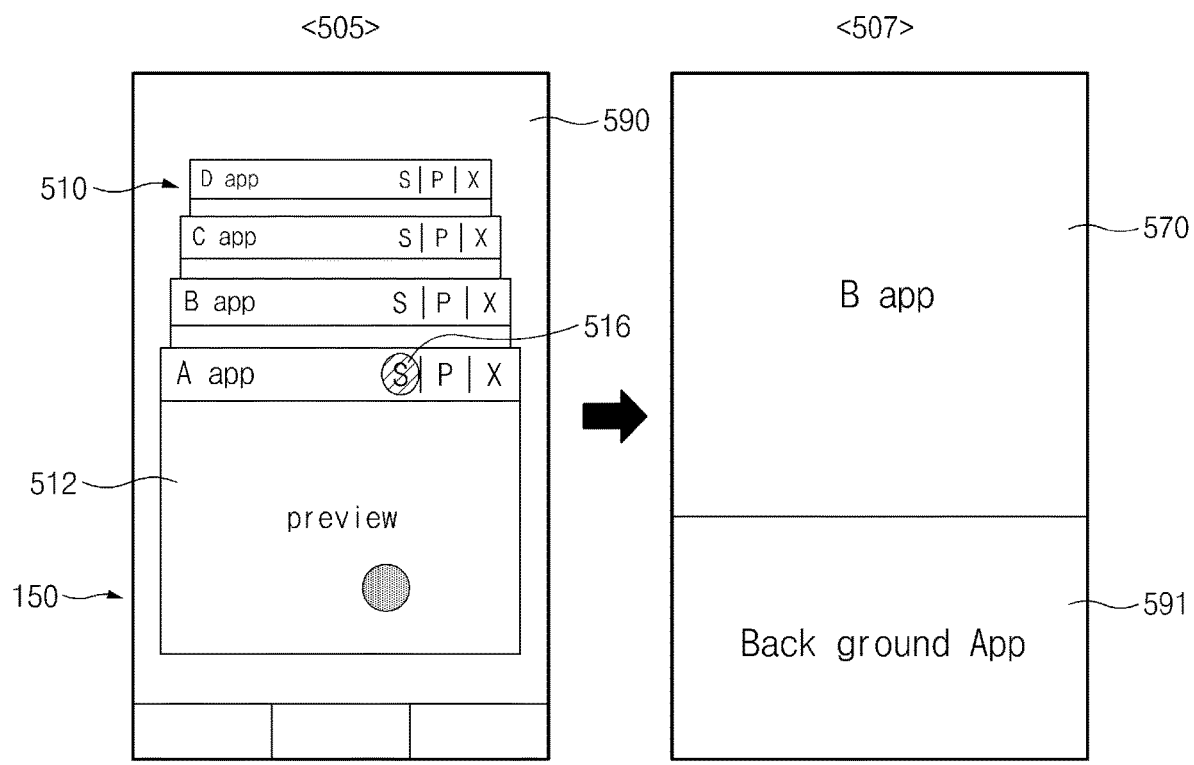
Figure 5C:
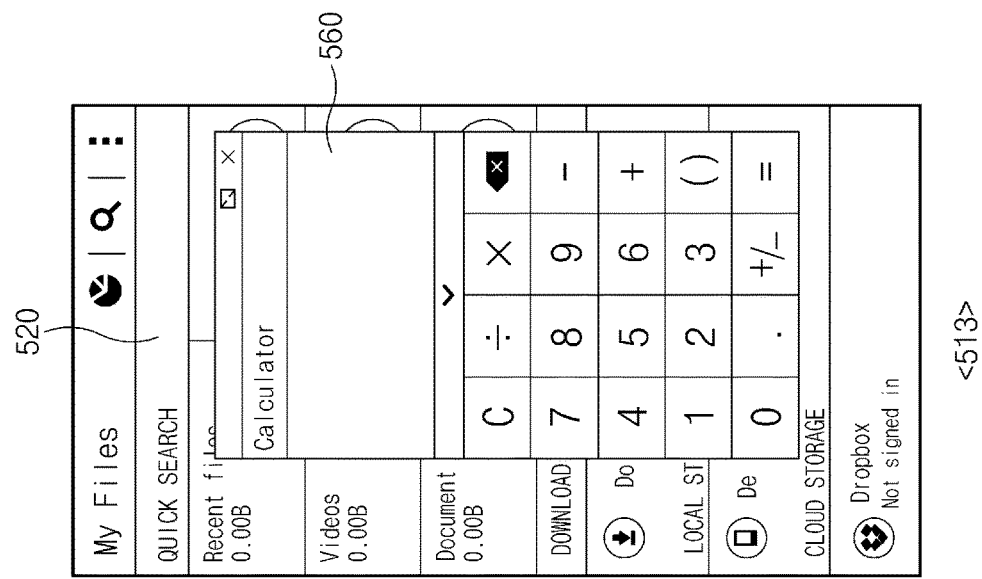
Figure 5C:
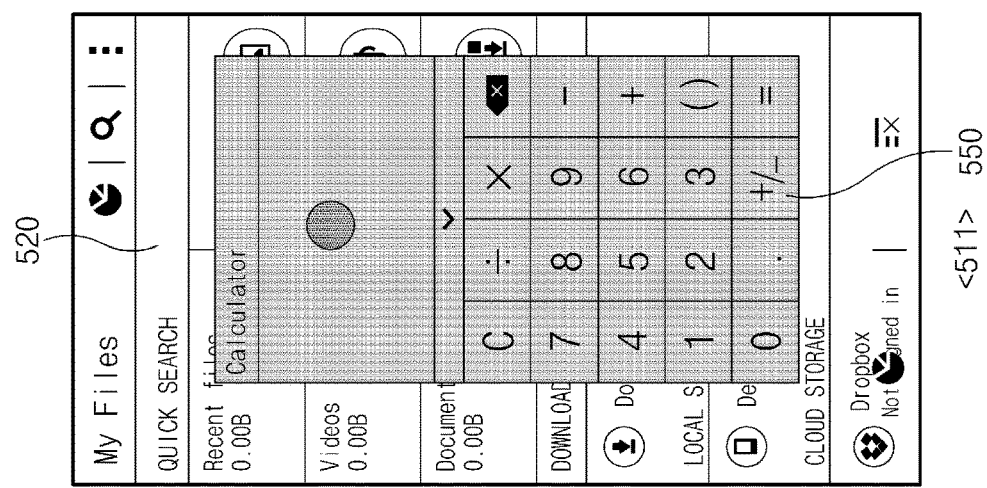
Figure 5C:
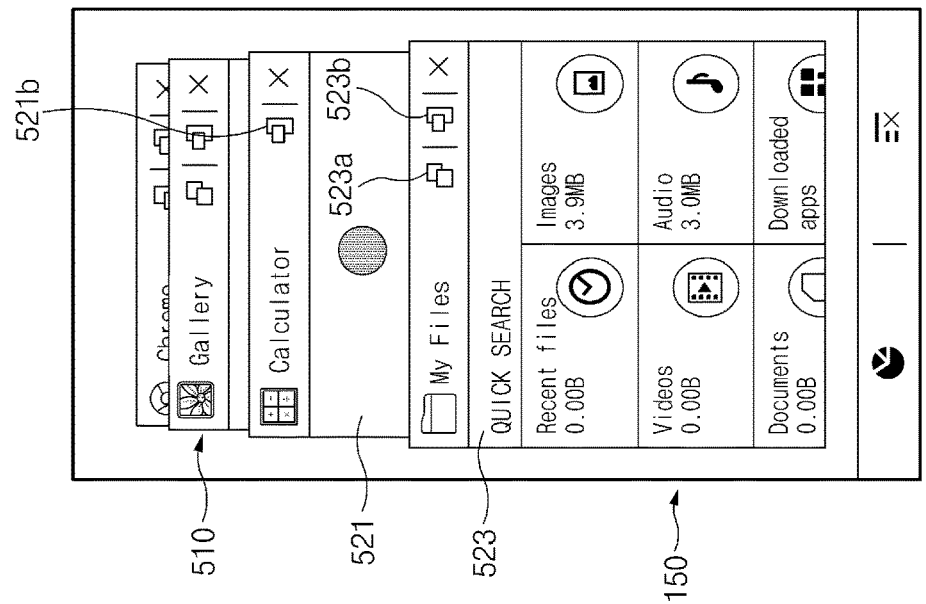

FIGS. 5A and 5C are diagrams illustrating a selection event based multi window form according to an embodiment of the present disclosure.

Referring to FIG. 5A, the display control module 170 may output a standby screen, a home screen, and so on according to an input event occurrence. According to an embodiment of the present disclosure, when a specified event, for example, an event relating to output of a recent execution list (or a search window) occurs, the display control module 170 outputs the recent execution list 510 to the display 150, as shown in state 501. The display control module 170 may provide an icon or menu relating to a recent execution list output. Additionally, the display control module 170 may allocate a key button relating to a recent execution list output. According to an embodiment of the present disclosure, when a home button is continuously pressed within a predetermined time interval or for a specified time, for example, the display control module 170 outputs the recent execution list 510 (e.g., a list including an application being executed currently or an application being executed through background processing). Alternatively, the display control module 170 may output the recent execution list 510 in response to receiving input from a predetermined combination of a plurality of buttons.

The recent execution list 510, as shown in FIG. 5A, may include a list item relating to at least one application supported by the electronic device 100 or set by a user or a list item relating to a plurality of applications being executed currently. For example, each list item in the recent execution list 510 may correspond to an application supported by the electronic device 100. The list item may include an image (e.g., a preview image provided during an application execution, an image for describing the type of an application, a thumbnail, and a predetermined size of icon) or text relating to an application. The list item may include at least one virtual button (e.g., guide information) in relation to an output window form control. For example, a list item 512 may include a virtual button S relating to a split window output, a virtual button P relating to a pop-up window output, and a virtual button X relating to the removal of the list item 512.

According to an embodiment of the present disclosure, the recent execution list 510 may provide list items (e.g., a window, an icon, and a thumbnail are available for display) corresponding to a plurality of applications being executed currently. While at least one window 590 corresponding to a plurality of application executions is output, if an event relating to the output of the recent execution list 510 occurs, the electronic device 100 may output the recent execution list 510, as shown in state 501. For example, the electronic device 100 may be in a state of executing applications A, B, C, and D. The list item may include a preview image relating to an application being executed currently. The order of the list items placed in the recent execution list 510 in state 501 may be adjusted according to an input event. For example, when a scroll event occurs in a predetermined area of the display 150, the display control module 170 may move the list item 512 to the back of the recent execution list 510 or place the list item 512 behind the last list item. Correspondingly, a list item relating to the application B may be placed in front of the recent execution list 510.

According to an embodiment of the present disclosure, when the virtual button 514 relating to the pop-up window output of the list item 512, the display control module 170 may output the pop-up window 580 relating to the list item 512 to the display 150, as shown in state 503. According to an embodiment of the present disclosure, when the pop-up window related virtual button 514 is selected as a touch event (e.g., a tap event or a touch hold event), the display control module 170 may provide the pop-up window 580 as guide information. When a specified event (e.g., a touch hold release event) occurs, the display control module 170 may output an execution screen of an application relating to the list item 512 as the pop-up window 580. When the pop-up window 580 is provided as guide information, the display control module 170 may cancel or remove the output of the pop-up window 580 according to a specified gesture event occurrence. When the pop-up window 580 is removed, the control module 170 may perform a control to return to the previous state 501 or return to a state before the output of the recent execution list 510.

Referring to FIG. 5B, while a recent execution list 510 is output on a window 590, as shown in state 505, the display control module 170 receives an event for selecting a split window related virtual button 516 relating to the list item 512. When the virtual button 516 of the list item 512 is selected, the display control module 170, as shown in state 507, places the output of an application relating to the list item 512 in a predetermined area of the display 150 as a split window 570. For example, the display control module 170 may place the split window 570 at the top of the display 150. Correspondingly, the display control module 170 may place the window 591, by changing at least one of the size and position of the window 590 at the bottom of the display 150. The window 591 may be in a form obtained when the size or position of the window 590 being executed currently is changed. Alternatively, the window 591 may be a specified application performed in background processing while the recent execution list 510 is output.

According to an embodiment of the present disclosure, the display control module 170 may adjust the position of the split window 570 according to the type of an event for selecting the virtual button 516. For example, when an event relating to the selection of the virtual button 516 is changed into a drag and drop form in an upper side (or left side) direction, the display control module 170 may place the split window 570 at the upper side of the display 150. Alternatively, when an event relating to the selection of the virtual button 516 is changed into a drag and drop form in a lower side (or right side) direction, the display control module 170 may place the split window 570 at the lower side of the display 150.

According to an embodiment of the present disclosure, when receiving an event for selecting the split window 570 and then moving it (e.g., a drag event for moving the split window 570 to an area where the window 591 is placed), the display control module 170 may change the position of the split window 570. According to an embodiment of the present disclosure, when the virtual button 516 is selected, the display control module 170 may perform a control to output a preview image of an application corresponding to the list item 512 to the split window 570. When a touch release event relating to the split window 570 occurs, the display control module 170 may perform a control to execute an application corresponding to the list item 512 and output execution information corresponding to the executed application to the split window 570.

Referring to FIG. 5C, when an event relating to the output of the recent execution list 510 occurs, the display control module 170 outputs the recent execution list 510 to the display 150, as shown in state 509. According to an embodiment of the present disclosure, the display control module 170 may output the recent execution list 510 to a specified window 520. The window 520 may be output to the display 150 right before the output of the recent execution list 510. Alternatively, the window 520 may relate to a list item 523 placed in front of the recent execution list 510. Alternatively, the window 520 may be set to be output as background during the output of the recent execution list 510. According to an embodiment of the present disclosure, the window 520 may be a standby screen or a home screen. According to an embodiment of the present disclosure, when the output of the recent execution list 510 being output to the front (e.g., the uppermost layer) of the window 520 is requested, the display control module 170 may place the list item 523 relating to the window 520 in the front of the recent execution list 510 and may place list items relating to another application corresponding to the predetermined order.

According to an embodiment of the present disclosure, an application relating to the list item 523 may be output as both a pop-up window and a split window. In this case, the list item 523, as shown in FIG. 5C, may include a virtual button 523a relating to a pop-up window output and a virtual button 523b relating to a split window output. According to an embodiment of the present disclosure, an application relating to the list item 521 among applications may support only a pop-up window output. In this case, the list item 521 may include a virtual button 521*b* relating to a pop-up window output, as shown in the FIG. 5C.

When an event relating to the selection of the list item 521 occurs, the display control module 170, as shown in state 511, may output a preview image 550 relating to the list item 521 in a predetermined area of the display 150. According to an embodiment of the present disclosure, the preview image relating a calculation application may be output on the window 520. The preview image 550 may be in a pop-up window form supported by the application of the list item 521. When an event relating to the preview image 550 (e.g., a touch release event) occurs, the display control module 170 may execute an application and as shown in state 513, may output information corresponding to execution on the display 150 in the form of the pop-up window 560. During this operation, the display control module 170 may output the pop-up window 560 on the window 520. According to an embodiment of the present disclosure, when an event for selecting the virtual button 521*b* included in the list item 521 occurs, the display control module 170 may output the pop-up window 560 as shown in state 513 without passing through the state 511. Alternatively, when an event for selecting the list item 521 occurs, the display control module 170 may output the pop-up window 560 as shown in state 513 without passing through the state 511. According to an embodiment of the present disclosure, when an event for selecting the list item 523 occurs, the display control module 170 may output guide information including a pop-up window image and a split window image in state 511. Then, when an event for selecting a pop-up window image or a split window image occurs, the display control module 170 may output a window corresponding to the list item 523 according to an event occurrence position.

Figure 5D:
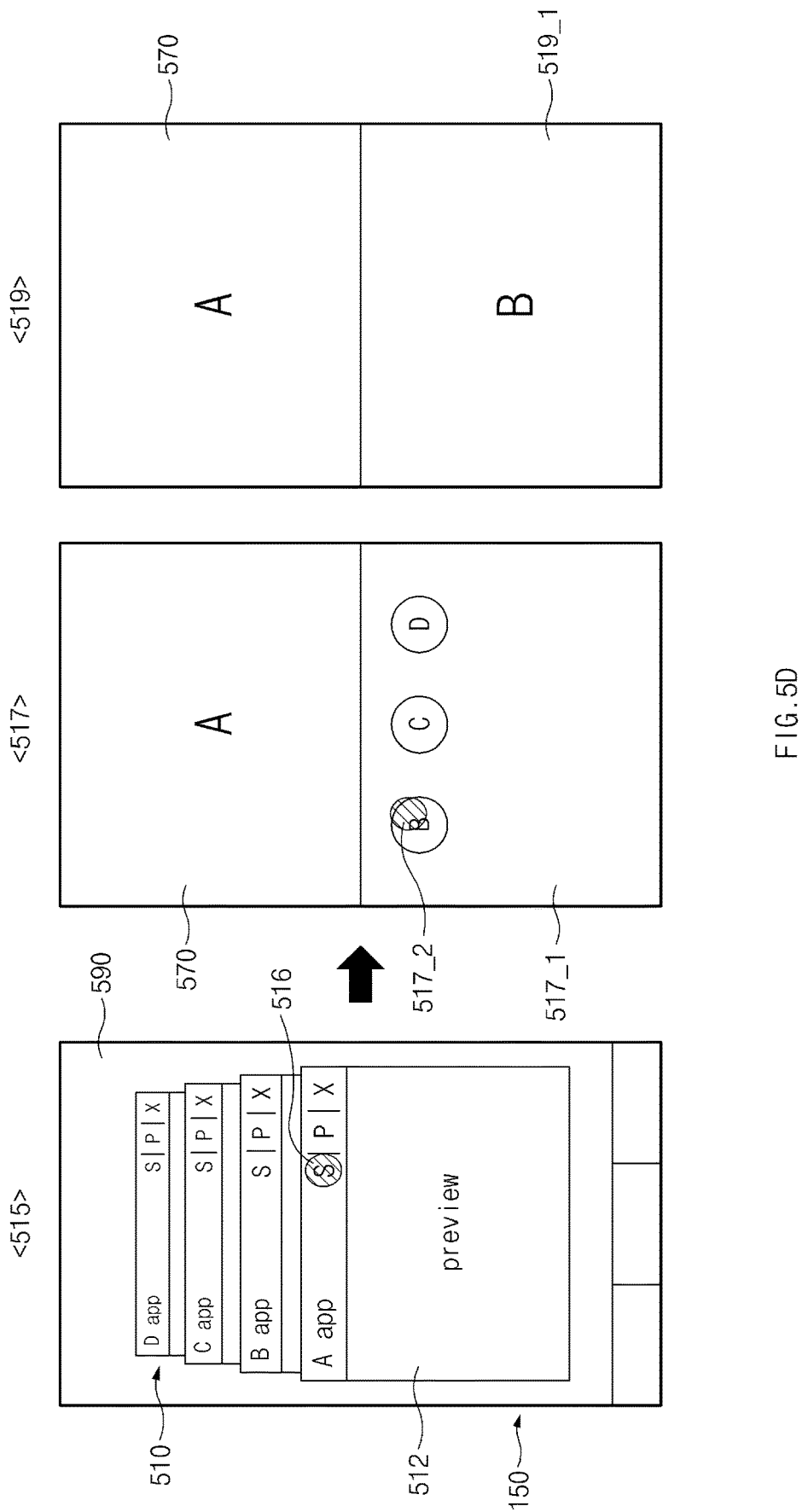

Referring to FIG. 5D, when an event relating to the output of the recent execution list 510 occurs, the display control module 170 may output the recent execution list 510 to the display 150, as shown in state 515. According to an embodiment of the present disclosure, the display control module 170 may output only the recent execution list 510 on the window 590. The window 590 may be output to the display 150 right before the output of the recent execution list 510. Alternatively, the window 590 may relate to a list item 512 placed in the front of the recent execution list 510. Alternatively, the window 590 may be set to be output as background during the output of the recent execution list 510. According to an embodiment of the present disclosure, the window 590 may be a standby screen or a home screen. According to an embodiment of the present disclosure, when output of the recent execution list 510 is requested, the display control module 170 may place the list item 512 relating to the window 590 corresponding to an immediately before executed application at the uppermost layer of the recent execution list 510, and may place recent execution items relating to another application according to a predetermined order.

According to an embodiment of the present disclosure, the list item 512, as shown in FIG. 5D, may include a virtual button P relating to pop-up window output and a virtual button S relating to split window output. When an event for selecting the virtual button 516 corresponding to split window output placed in the list item 512 occurs, the display control module 170, as shown in state 517, may output the split window 570 relating to the list item 512 to a predetermined area of the display 150 (e.g., a predetermined upper area of the display 150).

According to an embodiment of the present disclosure, according to the output of the split window 570, the display control module 170 may output an item selection area 517_1 relating to other list items to a predetermined area of the display 150. The item selection area 517_1 may correspond to items (e.g., an app B, an app C, and an app D) included in the recent execution list 510 except for the list item 512. According to an embodiment of the present disclosure, the item 517_2 may correspond to app B in the recent execution list 510. According to an embodiment of the present disclosure, items relating to an application that a user uses frequently may be additionally placed in the item selection area 517_1. In relation to placing frequently used applications in the item selection area 517_1, the electronic device 100 may include store and manage at least one of information on the selection frequency for applications, information on the use time of selected applications, and type information on recently used applications. Based on the above information, the electronic device 100 may output recently used application list items (e.g., the specified predetermined number of items), frequently used application list items (e.g., items corresponding to applications of a specified predetermined frequency, which are arranged sequentially on the basis of the most frequently used application), and use time specific application list items (e.g., items corresponding to applications used more than a specified predetermined time, which are sequentially arranged on the basis of the application having the highest use time). Alternatively, the electronic device 100 may output a predetermined number of list items to the item selection area 517_1 by applying the above information complexly or assigning a weight for predetermined information (e.g., assigning a higher weight to a use time than a frequency). According to an embodiment of the present disclosure, the electronic device 100 may output items being executed through background processing and items calculated based on the above information to the item selection area 517_1.

According to an embodiment of the present disclosure, when an event for selecting the item 517_2 from the item selection area 517_1 occurs, the display control module 170 may output a split window 519_1 corresponding to the item 517_2 to a predetermined area of the display 150, as shown in state 519. For example, the display control module 170 may output the split window 519_1 to an area that is separated from the splint window 570. When a specified event occurs, the display control module 170 may output the recent execution list 510 as shown in state 515 and may return to the state 517 including the item selection area 517_1.

Although FIG. 5D illustrates an example in which the recent execution list 510 changes into the form of the item selection area 517_1, an embodiment are not limited thereto. For example, according to an embodiment of the present disclosure, the item selection area 517_1 may be replaced by a recent execution list excluding the list item 512.

Figure 5E:
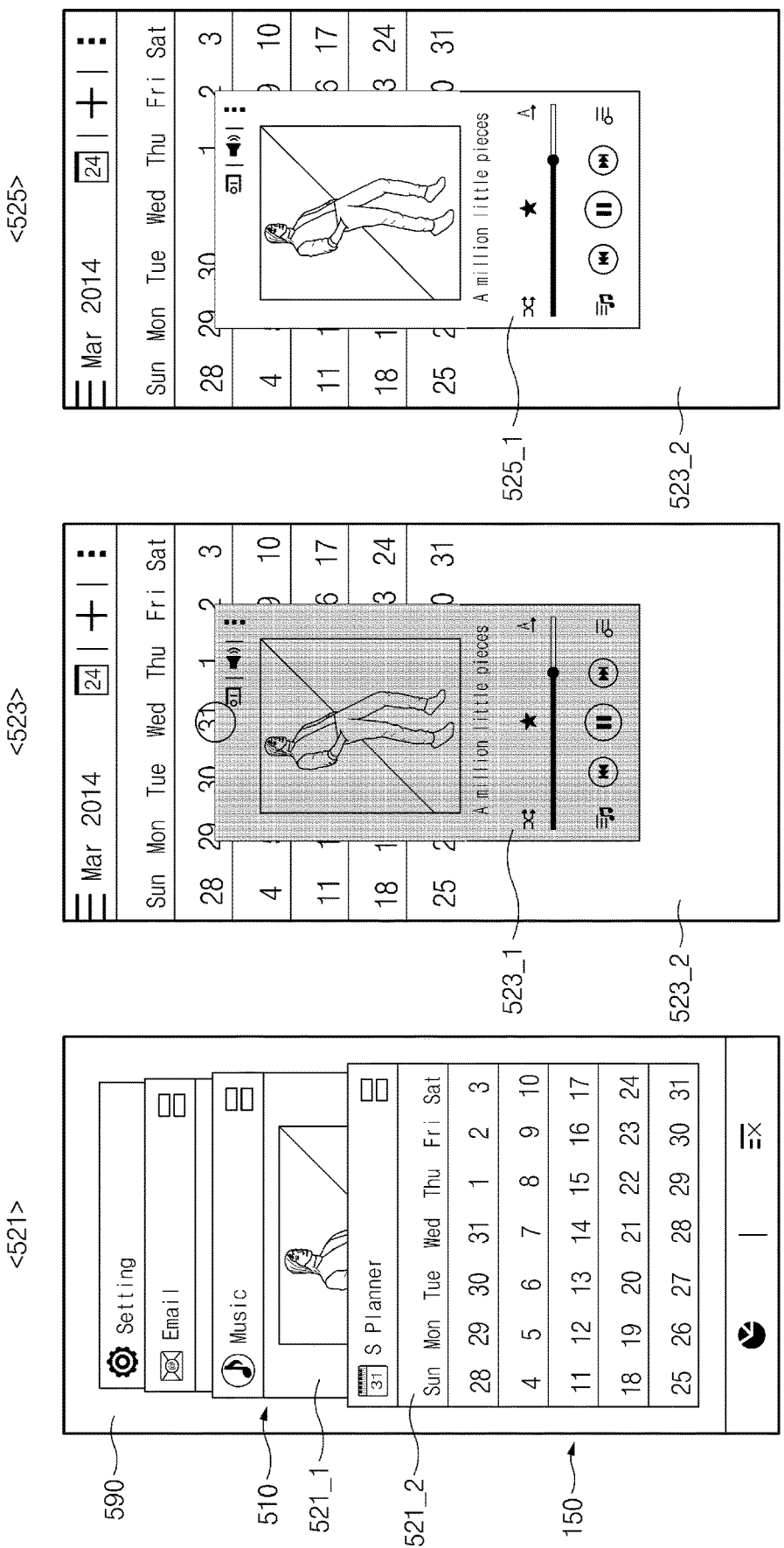

Referring to FIG. 5E, when an event relating to output of the recent execution list 510 occurs, the display control module 170 may output the recent execution list 510 to the display 150, as shown in state 521. According to an embodiment of the present disclosure, when outputting the window 590 or the recent execution list 510 to the display 150, the display control module 170 may output the recent execution list 510 on the window 590 set to be output as background. A list item 521_2 placed at the top (e.g., the uppermost layer)

in the recent execution list 510 may relate to a window output on the display 150 right before the output of the recent execution list 510.

According to an embodiment of the present disclosure, when a specified event (e.g., a long press event) relating to the list item 521_1 occurs, the display control module 170 may output the guide information 523_1 corresponding to the list item 521_1, as shown in state 523. While outputting the guide information 523_1, the display control module 170 may place an application executed before the output of the guide information 523_1, for example, the window 523_2 relating to the list item 521_2, as the background of the pop-up window 523_1.

According to an embodiment of the present disclosure, the list item 521_1 may be a thumbnail relating to a corresponding application. When the output of the recent execution list 510 is requested, the display control module 170 may create a thumbnail by capturing the screens of an application being executed in front and application being executed through background processing. Alternatively, the display control module 170 may read a specified thumbnail corresponding to applications from a memory. The display control module 170 may output the recent execution list 510 on the basis of a thumbnail relating to applications.

According to an embodiment of the present disclosure, when a specified time elapses after the guide information 523_1 is output or a specified event (e.g., a long press release event) occurs, the display control module 170 may output the pop-up window 525_1, as shown in state 525. The pop-up window 525_1 may be output on the window 523_2.

According to an embodiment of the present disclosure, the display control module 170 may output the pop-up window 525_1 without outputting the guide information 523_1. For example, when a specified event relating to the item 521_1 occurs in state 521, the display control module 170 may output the pop-up window 525_1 on the window 523_2 corresponding to an application executed right before the output of the recent execution list 510, as shown in state 525.

Figure 5F:
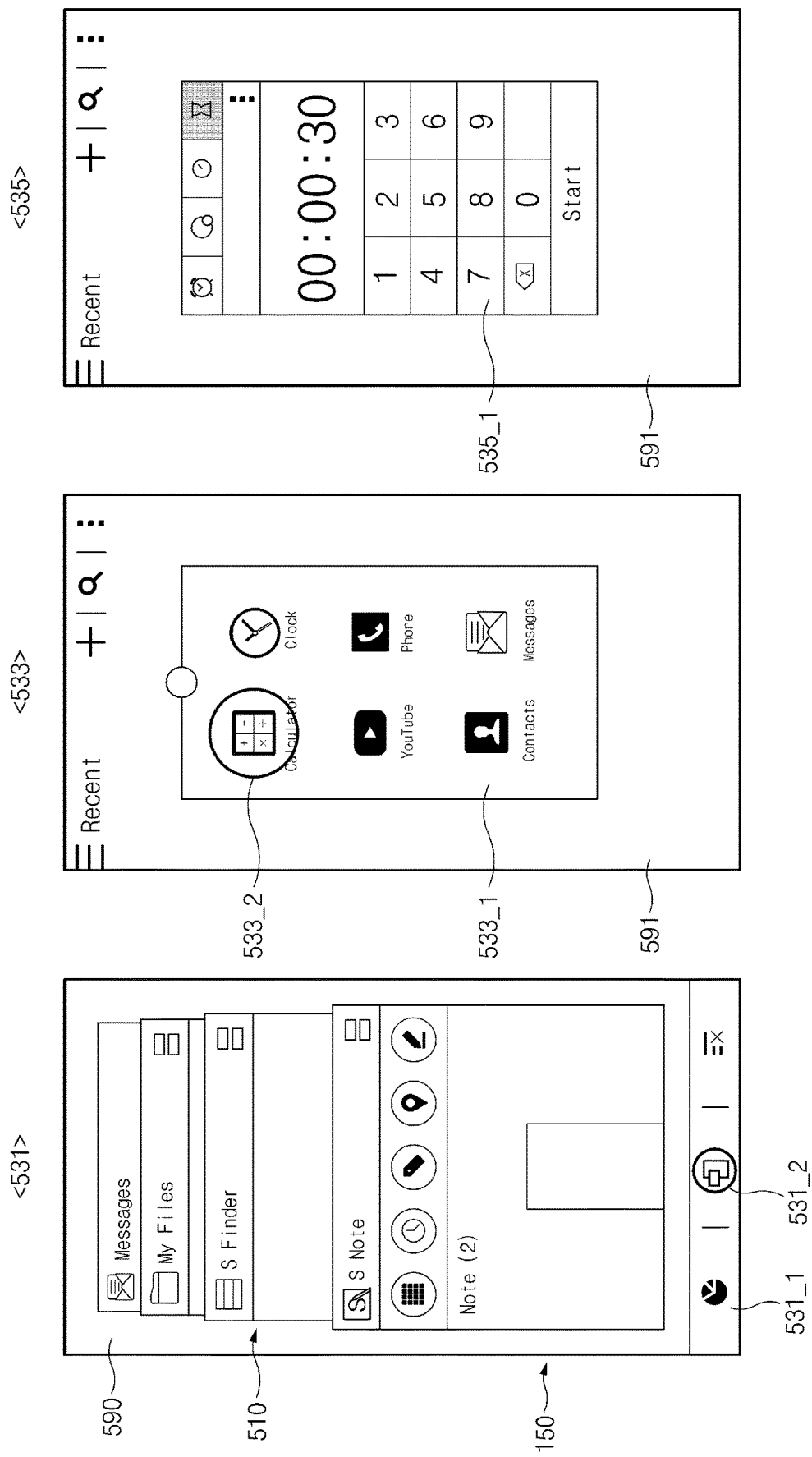

Referring to FIG. 5F, when an event relating to output of the recent execution list 510 occurs, the display control module 170 may output the recent execution list 510 to the display 150 as shown, in state 531. According to an embodiment of the present disclosure, when outputting the window 590 or the recent execution list 510 output to the display 150, the display control module 170 may output the recent execution list 510 on the window 590 set to be output as a background.

According to an embodiment of the present disclosure, the display control module 170 may output a shortcut area 531_1, in addition to outputting the recent execution list 510. The shortcut area 531_1 may include a virtual button 531_2 relating to a pop-up window output. According to an embodiment of the present disclosure, the shortcut area 531_1 may further include a split window related virtual button.

When an event (e.g., a touch event) relating to the virtual button 531_2 occurs, the display control module 170 may output a pop-up window 533_1, as shown in state 533. The display control module 170, for example, may output the pop-up window 533_1 on the window 591 corresponding to an immediately before executed function (e.g., a recent execution list output function). The pop-up window 533_1 may include at least one item available to be output in a pop-up window form. For example, the display control module 170 may output, to the pop-up window 533_1, at least one item available to be output in a pop-up window from among all user functions that the electronic device 100 supports. Alternatively, the display control module 170 may output, to the pop-up window 533_1, at least one item available to be output in a pop-up window from among applications corresponding to an item included in the recent execution list 510. If there are no available items to be output in a pop-up window form, the display control module 170 may output the pop-up window 533_1 without any items.

When an event (e.g., a touch event) relating to the selection of the specific item 533_2 is received from the pop-up window 533_1, the display control module 170 may execute an application relating to the item 533_2 and output a window corresponding to the application execution to the display 150 in the form of a pop-up window 535_1 as shown, in state 535. According to an embodiment of the present disclosure, the display control module 170 may output the pop-up window 535_1 on the window 591. The window 591, for example, may be a screen where the recent execution list 510 is output.

Figure 6A:
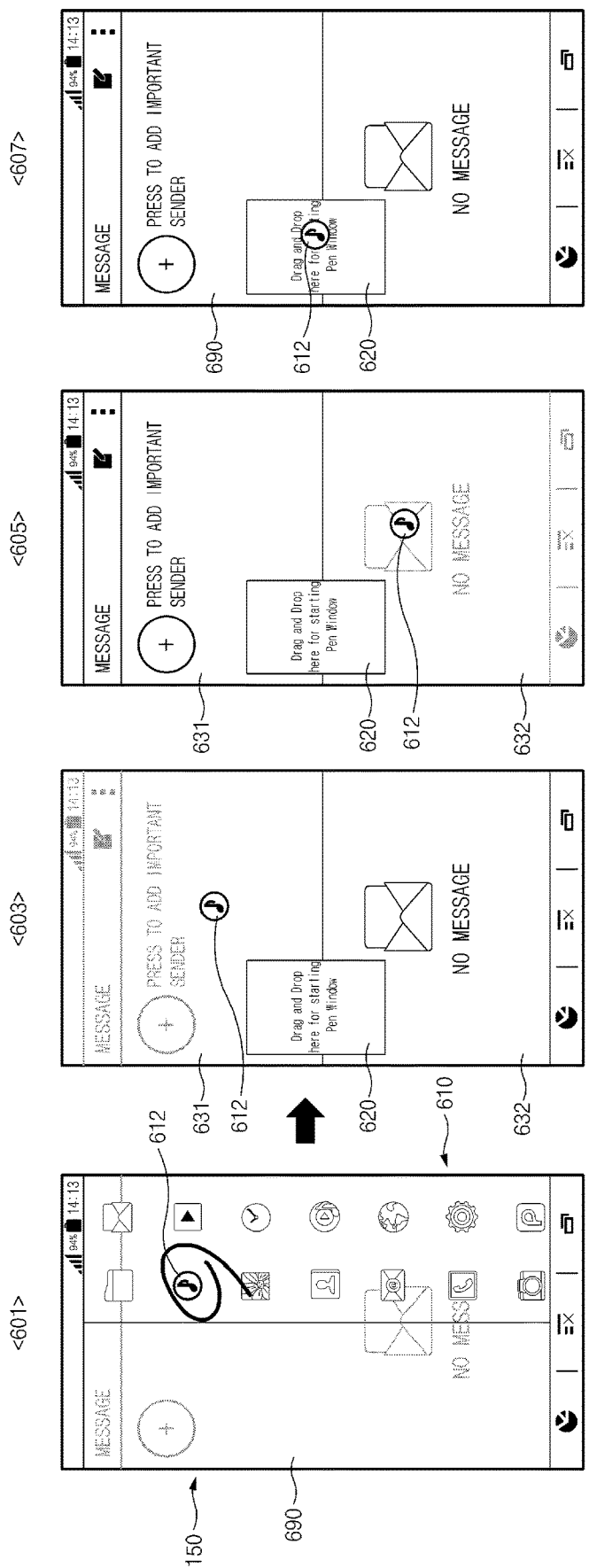
FIGS. 6A to 6C are diagrams illustrating a multi window preview according to an embodiment of the present disclosure.
Figure 6B:
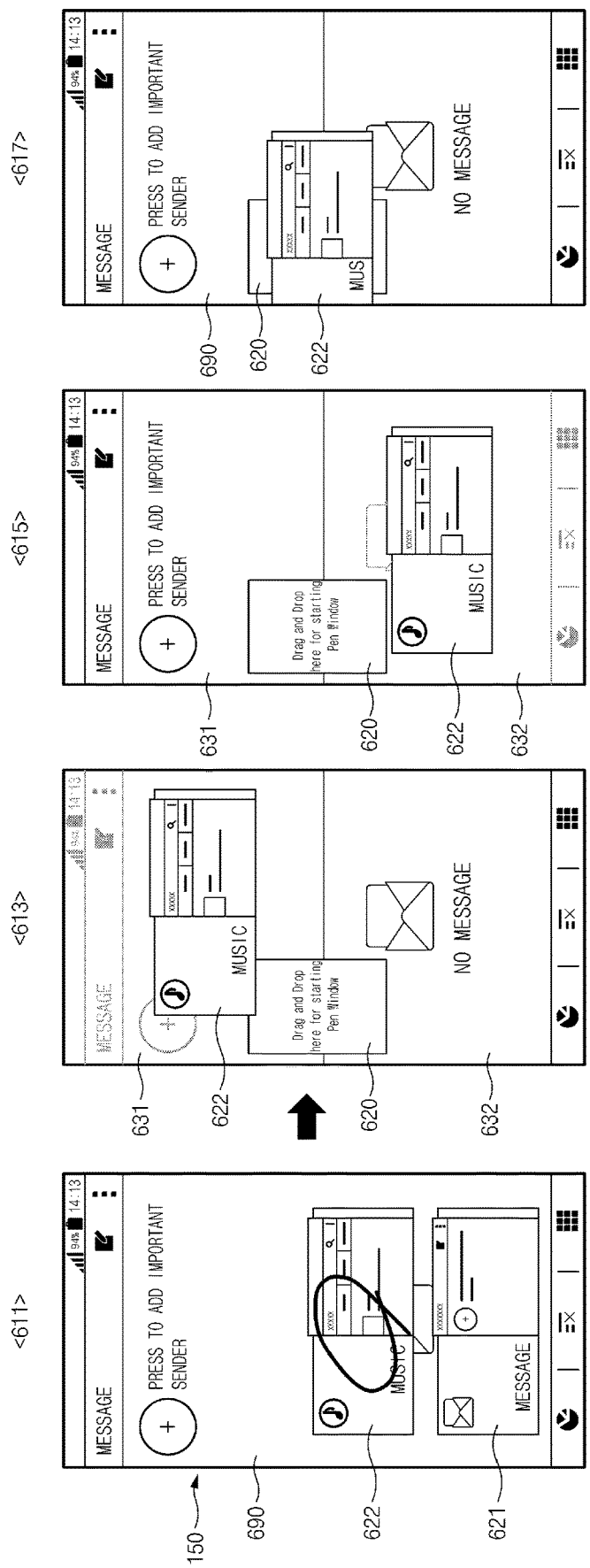
Figure 6C:
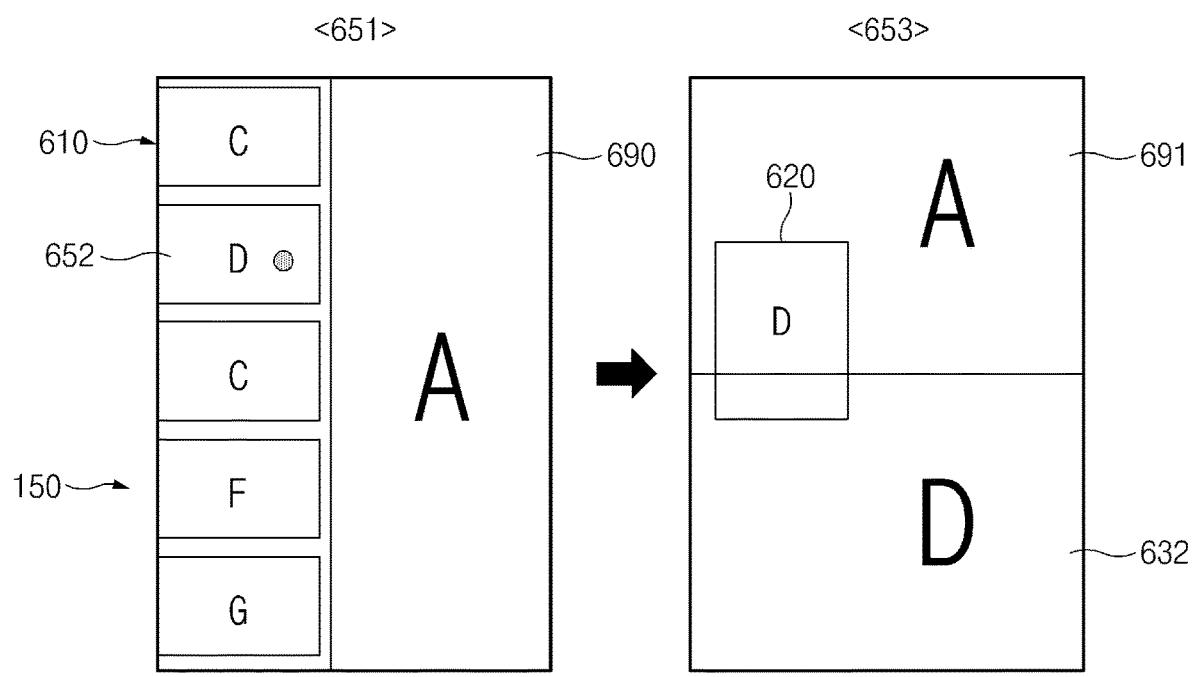

FIGS. 6A to 6C are diagrams illustrating a multi window preview according to an embodiment of the present disclosure.

Referring to FIG. 6A, the display control module 170 outputs a window tray 610 on a window 690, as shown in state 601, which corresponds to an input event occurrence, or corresponds to information regarding specified job scheduling executed by a processor of the electronic device 100. The window 690 may relate to an application executed before the output of the window tray 610. The window tray 610 may include at least one item, as shown in FIG. 6A. At least one item may relate to a function that the electronic 100 is capable of supporting.

According to an embodiment of the present disclosure, when an item 612 is selected from the window tray 610, the display control module 170 may output at least one of preview related guide information 631, 632, and 620 according to a movement after the selection of the item 612. For example, when the selection item 612 is moved to and placed at a location that overlaps the guide information 631, as shown in state 603, the display control module 170 may display the preview of the top split window to be provided by the item 612 on the guide information 631. For example, when the selection item 612 is moved to and placed at a location that overlaps the guide information 632, as shown in state 605, the display control module 170 may display the preview (e.g., a corresponding window related thumbnail image, a predetermined size of icon, or a text for describing a split window) of the bottom split window to be provided by the item 612 on the guide information 632. When the selection item 612 is moved and placed to overlap the guide information 620, as shown in state 607, the display control module 170 may display the preview of a pop-up window to be provided by the item 612 on the guide information 620.

Referring to FIG. 6B, the display control module 170 outputs a recent execution list screen, as shown in state 611, which corresponds to an input event occurrence or scheduled information. The recent execution list screen, for example, may include a window 690 including at least one of items 621 and 622. The items 621 and 622 may be items relating to recently executed applications (e.g., applications being executed through front or background processing right before the output of the recent execution list). For example, the items 621 and 622 may include a message function item and a music playback function item, respectively. When a specified event (e.g., a home key selection event and so on) occurs during executions of a plurality of applications, the display control module 170 may output, on the window 690, the items 621 and 622 relating to applications in execution. According to an embodiment of the present disclosure, when the item 622 is selected and then moved, the display control module 170 may maintain a previous output form of the item 622. Alternatively, according to an embodiment of the present disclosure, according to the movement of the item 622, the display control module 170 may replace the item 122 with a relatively small thumbnail or icon and then, display the thumbnail or icon.

According to an embodiment of the present disclosure, when the item 622 is selected, the display control module 170 may output guide information 631, 632, and 620 corresponding to the selection of the item 622. The display control module 170 may display, on guide information, at least one output capable window form according to the overlapping of the item 622. For example, when the item 622 is placed in a top area of the display 150, the display control module 170 may display, on the guide information 631, the preview of a top split window to be provided by the item 622, as shown in state 613. When the item 622 is placed in a bottom area of the display 150, the display control module 170 may display, on the guide information 632, the preview of a bottom split window to be provided by the item 622, as shown in state 615. When the item 622 is placed in a predetermined center area of the display 150, the display control module 170 may display, on the guide information 620, the preview of a pop-up window to be provided by the item 622, as shown in state 617.

Referring to FIG. 6C, when an item is selected, the display control module 170 displays, on the display 150, a preview of information and/or services that may be provided in relation to a corresponding item. For example, the display control module 170 may output a window tray 610 to the display 150, as shown in state 651, corresponding to an event occurrence. During this operation, the display control module 170 may output the window tray 610 on the window 610. The window 690 may relate to an application executed before the output of the window tray 610.

When item 652 of the window tray 610 is selected, the display control module 170 may display, on the display 150, previews of all windows available to be provided in relation to the selected item 652. For example, the display control module 170 may output a pop-up window preview on the guide information 620 and output a split window preview on the guide information 632, as shown in state 653. The display control module 170 may output a window 691 obtained by adjusting the window 690 according to a preview display.

Figure 7A:
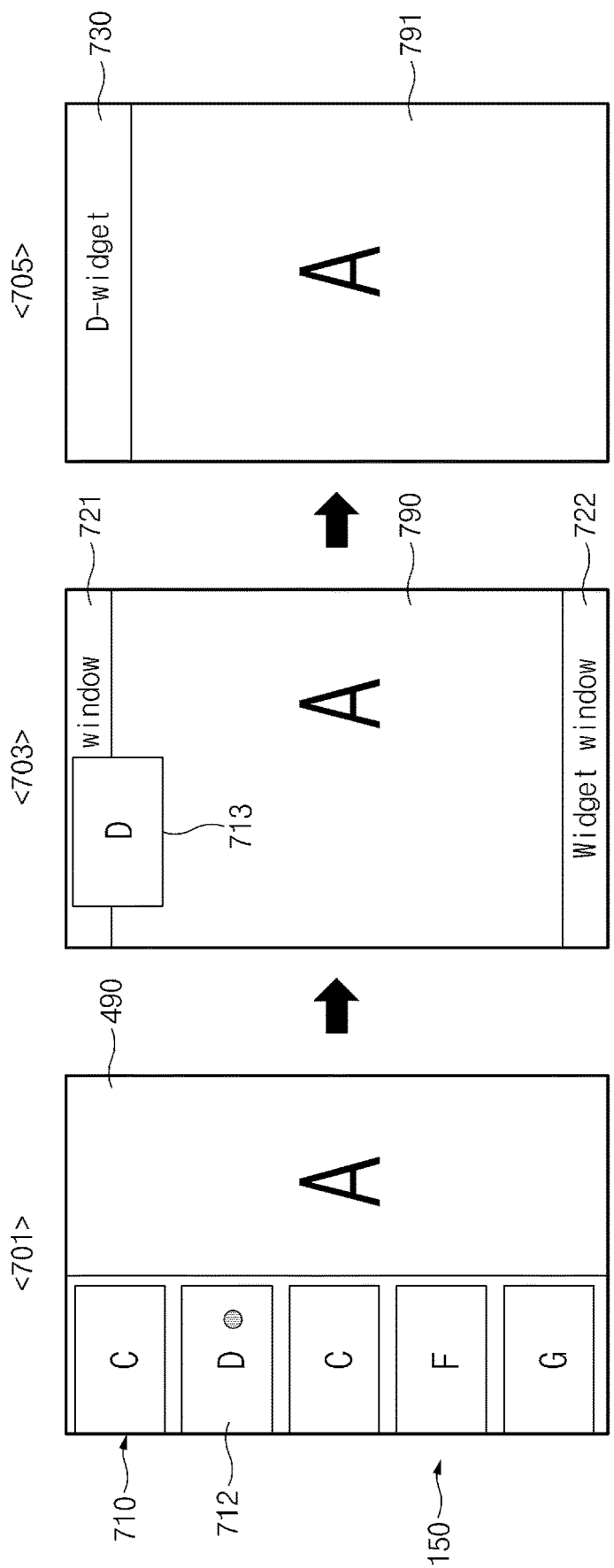
Figure 7B:
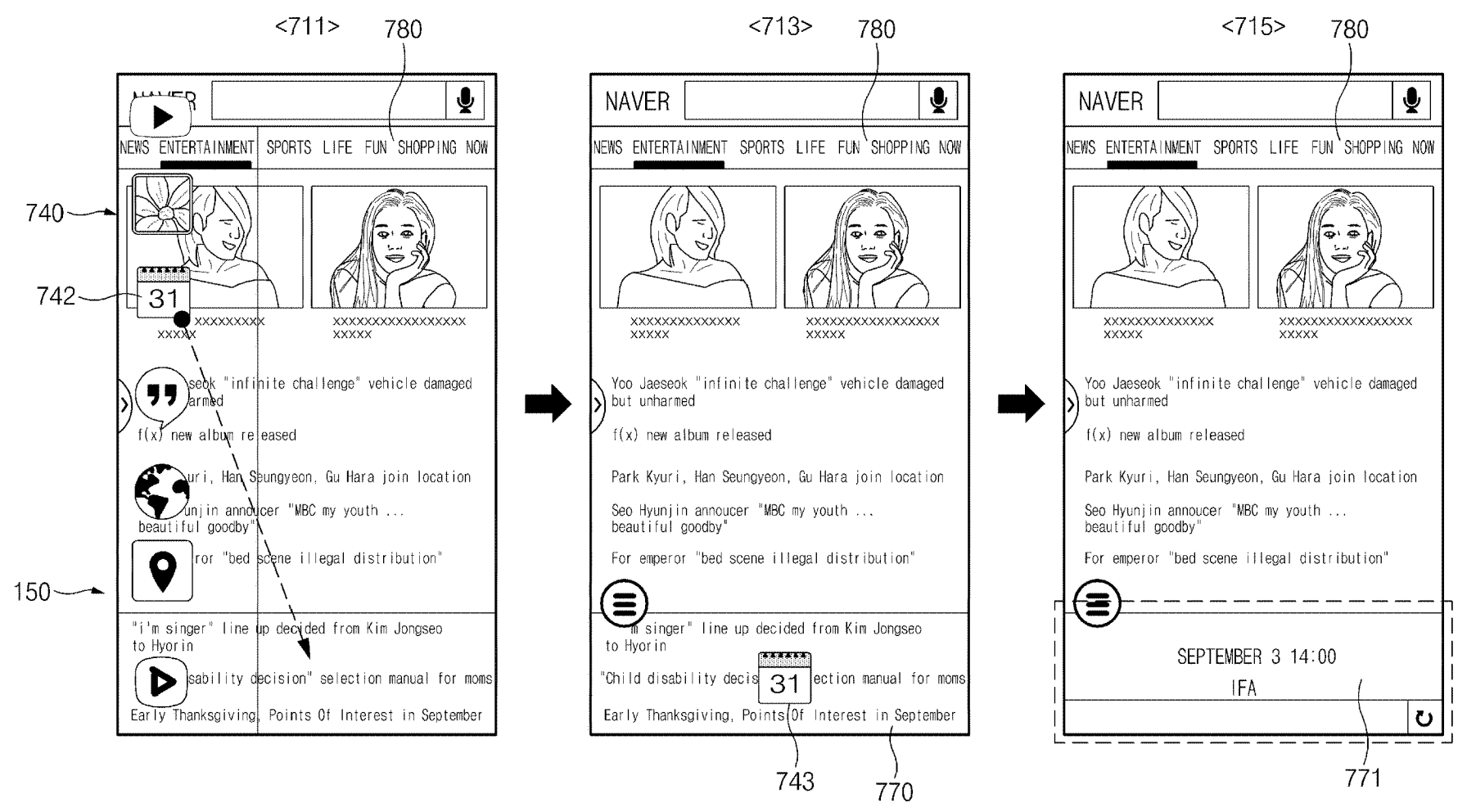

FIGS. 7A and 7B are diagrams illustrating a multi window with a widget window according to an embodiment of the present disclosure.

Referring to FIG. 7A, as shown in state 701, the display control module 170 may output a window 790 where a window tray 710 is displayed, on the display 150. When an item 712 placed in the window tray 710 is selected, the display control module 170 may output guide information 721 and 722 corresponding to the selection of the item 712, as shown in state 703. Alternatively, as the item 712 is moved to a predetermined position, the display control module 170 may output the guide information 721 and 722 to the display 150. The guide information 721 or 722 may be a widget window preview relating to the item 712.

According to an embodiment of the present disclosure, when an event (e.g., a drag event) relating to a movement occurs after the selection of the item 712, the display control module 170 may display a movement item 713 corresponding to the selected item 712. When a specified event (e.g., a touch release event) occurs as the movement item 713 is placed on the guide information 721, the display control module 170 may output the widget window 730 relating to the item 712 in relation to the guide information 721, as shown in state 705. For example, the display control module 170 may place the widget window 730 at the top of the display 150. During this operation, the display control module 170 may output a window obtained by adjusting the size of the window 790. In relation to the above-mentioned operation support, when a specified event occurs as the movement item 713 is placed on the guide information 721, the display control module 170 may execute a widget application (e.g., D-widget) relating to the selected item 712. The display control module 170 may output the widget window 730 on the basis of widget information of an executed widget application.

Referring to FIG. 7B, the display control module 170 may output a webpage window 780 to the display 150, as shown in state 711. The display control module 170 may output a window tray 740 on the webpage window 780 according to an input event occurrence. When an item 742 placed on the window tray 740 is selected and moved, the display control module 170 may output a movement item 743, as shown in state 713. Additionally, when the item 742 is selected or the item 742 is selected and moved, the display control module 170 may output guide information 770 to a predetermined area of the display 150. Alternatively, when the movement item 743 is placed in a specified predetermined area, for example, a predetermined lower area of the display 150, the display control module 170 may output the guide information 770 relating to the selected item 742. The guide information 770, for example, may be a widget window preview screen. When a specified event (e.g., a touch release event) occurs as the movement item 743 is placed on the guide information 770, the display control module 170 may output the widget window 771 relating to the item 742 to the display 150, as shown in state 715. During this operation, the display control module 170 may maintain a state of the window 780. Alternatively, according to an embodiment of the present disclosure, the display control module 170 may output a window excluding a predetermined area corresponding to the creation of the widget window 771 in the window 780. According to an embodiment of the present disclosure, the item 742 may correspond to a schedule function application. When the item 742 is moved to the area of the guide information 770 and a touch release event occurs, the display control module 170 may execute a widget application corresponding to the item 742. The display control module 170 may output the widget window 771 to a predetermined area (e.g., the area of the guide information 770) of the display 150 corresponding to an execution of a widget application corresponding to the item 742, as shown in state 715.

Figure 8A:
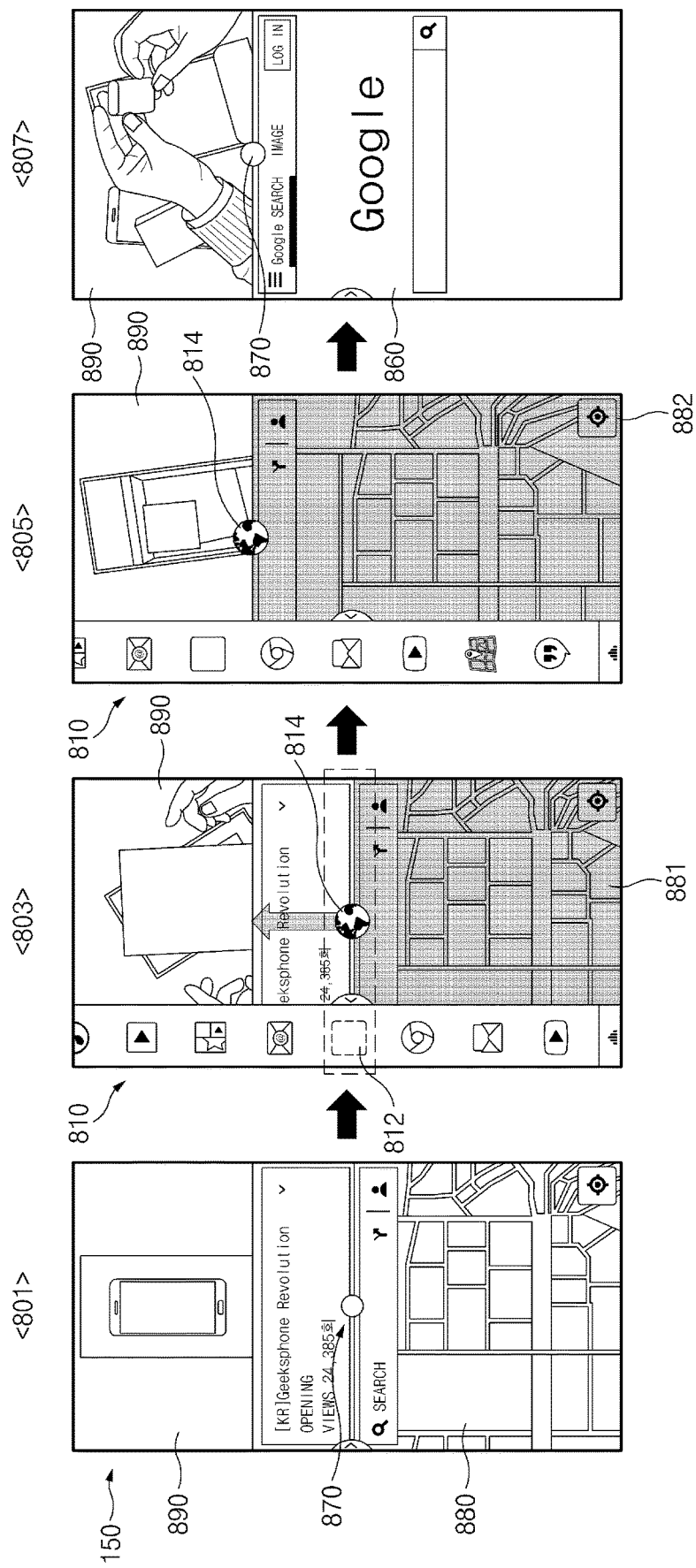
FIGS. 8A to 8C are diagrams illustrating a multi window adjustment function according to an embodiment of the present disclosure.
Figure 8B:
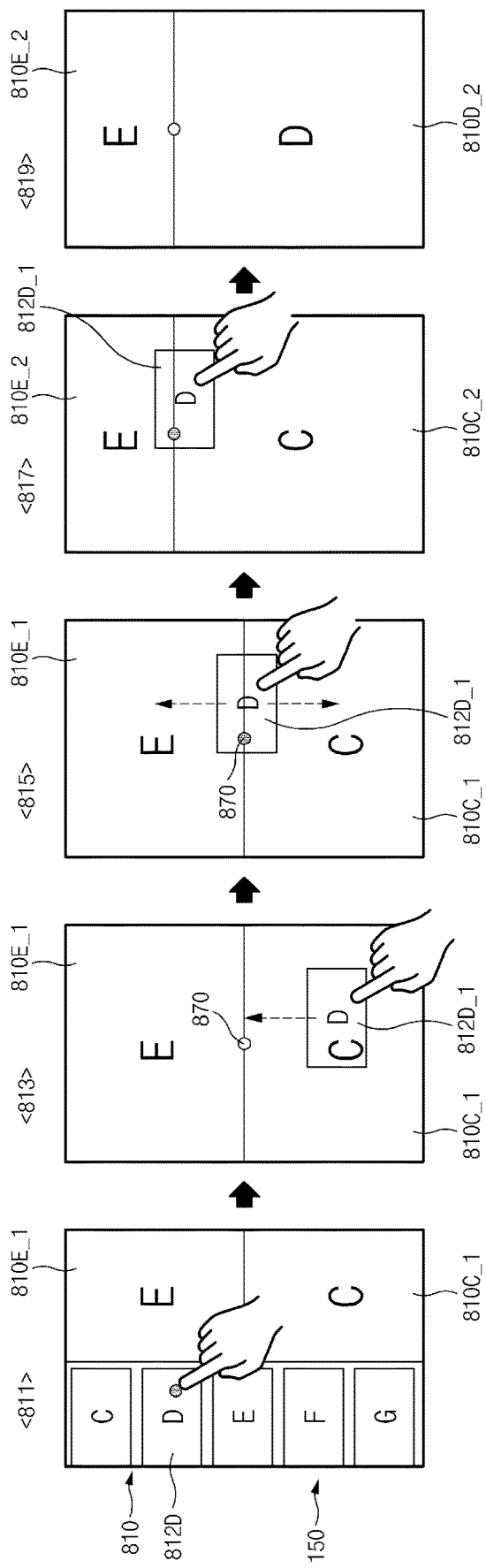
Figure 8C:
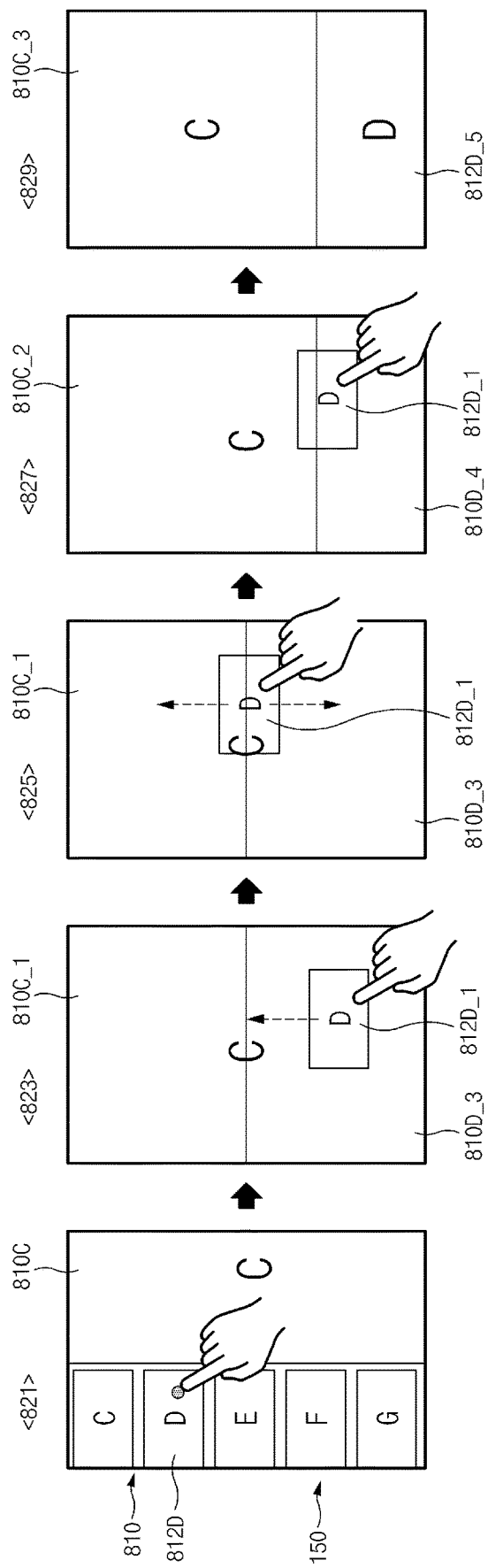

FIGS. 8A to 8C are diagrams illustrating a multi window adjustment function according to an embodiment of the present disclosure.

Referring to FIG. 8A, the display control module 170 may output a multi window to the display 150, as shown in state 801 according to a user input control or according to an execution according to specified schedule information. According to an embodiment of the present disclosure, the display control module 170 may output a video playback window 890 at the top of the display 150 and output a map search window 880 at the bottom of the display 150. The video playback window 890 and the map search window 880 may be output in a split window form. Additionally, the display control module 170 may output a handler 870 to a predetermined area (e.g., a multi window boundary area) of the display 150. The handler 870 may be used to adjust the screen size of the video playback window 890 or the map search window 880.

According to an occurrence of an input event, the display control module 170 may output a window tray 810 to a predetermined area of the display 150, as shown in state 803. When an item 812 is selected from the window tray 810 and moved by a predetermined distance, the display control module 170 may output a movement item 814 to the display 150. For example, the display control module 170 may output the movement item 814 at a position corresponding to a drag event. When at least part of the movement item 814 overlaps the handler 870 or the movement item 814 is placed on a split window area, for example, the area 880, the display control module 170 may output a window preview screen relating to the selected item 812 as guide information 881.

According to an embodiment of the present disclosure, the display control module 170 may output information (e.g., a screen shadow change, a color change, and so on) for indicating that a window relating to the item 812 is displayed with a corresponding size in relation to the overlapping of the movement item 814 and the handler 870.

According to an embodiment of the present disclosure, when an event (e.g., a drag event) occurs as the movement item 814 and the handler 870 overlap each other, the display control module 170 may adjust a window preview size relating to the movement item 812. For example, when a drag event for moving the handler 870 overlapped with the movement item 814 in an upward direction occurs, the display control module 170 may expand the window preview 881, as shown in state 805, to display the expanded window preview 882. When a drag event for moving the handler 870 overlapped with the movement item 814 in a downward direction occurs, the display control module 170 may reduce the window preview 881. As the window preview 881 is size-changed to the window preview 882, the display control module 170 may adjust the size of the video playback window 890.

When an event (e.g., a touch release event) relating to the movement item 814 occurs, the display control module 170 may execute an application relating to the item 812. For example, the display control module 170 may execute a web browser application relating to the item 812. The display control module 170 may place the split window 860 configured with obtained information on the area of the window preview 882 corresponding to a web browser execution as shown, in state 807. According to an embodiment of the present disclosure, when the movement item 814 overlaps the handler 870, the display control module 170 may change the display form of the handler 870 in relation to the movement item 814. Alternatively, the display control module 170 may replace the form of the handler 870 with the movement item 814.

Referring to FIG. 8B, the display control module 170 may output a multi window (e.g., a window 810e_1 and a window 810c_1) to the display 150, as shown in state 811 according to a user input control or corresponding to a specified schedule information execution. According to an embodiment of the present disclosure, the display control module 170 may output a video playback window 810e_1 at the top of the display 150 and output a map search window 810c_1 at the bottom of the display 150. The window 810e_1 and the window 810c_1 may be output in a split window form. Additionally, according to an input event occurrence, the display control module 170 may output a window tray 810 to a predetermined area of the display 150, as shown in state 811.

When an item 812D is selected from the window tray 810 and moved by a predetermined distance, the display control module 170 may output a movement item 812D_1 to the display 150, as shown in state 813. For example, the display control module 170 may output the movement item 812D_1 at a position corresponding to a drag event. During this operation, the display control module 170 may set an area to where an item is moved as an area (e.g., an area where an item is executed when the item is placed on a corresponding area or after that, a specified event occurs) relating to an item execution. Additionally, the display control module 170 may output a handler 870 to a predetermined area (e.g., a multi window boundary area) of the display 150. When the movement item 812D_1 overlaps a window, the display control module 170 may change the display effect (e.g., shadow processing or highlight processing) of the overlapped window.

When at least part of the movement item 812D_1 overlaps the handler 870, as shown in state 815, the display control module 170 may support to adjust the size of a window that the movement item 821D 1 overlaps, for example, the window 810c_1. For example, when an event (e.g., a drag event for moving the movement item 812D_1) occurs as the movement item 812D_1 and the handler 870 overlap each other, the display control module 170 may adjust the size of the window 810c_1 overlapping the item 812D_1. According to an embodiment of the present disclosure, when the movement item 812D_1 at least partially overlaps the handler 870 moves in an upward direction as shown, in state 817, the display control module 170 may expand and display the window 810c_1, as shown in state 817. According to an embodiment of the present disclosure, when a drag event for moving the movement item 812D_1, which at least partially overlaps the handler 870 in a downward direction occurs, the display control module 170 may reduce the size of the window 810c_1 according to the drag event occurrence.

When a specified event (e.g., an event for releasing a touch of the movement item 812D_1) as the size of the window 810c_1 is adjusted, as shown in state 819, the display control module 170 may perform a control to output, to the display 150, the window 812D_2 corresponding to the size of the size-changed window 810c_2. In relation to this, when a touch release event for the movement item 812D_1 occurs, the display control module 170 may execute an application relating to the movement item 812D_1 and may adjust the screen size corresponding to an execution to the size of the window 810c_2. Alternatively, when executing an application relating to the movement item 812D_1, the display control module 170 may perform a control to execute the application in a window form adjusted to the size of the window 810c_2.

Referring to FIG. 8C, the display control module 170 may output a window 810c to the display 150, as shown in state 821 according to a user input control or corresponding to a specified schedule information execution. According to an embodiment of the present disclosure, the window 810c may be output to the display 150 in a full screen form. When a specified event occurs, the display control module 170 may output a window tray 810.

When an item 812D is selected from the window tray 810 and moved by a predetermined distance, the display control module 170 may output a movement item 812D_1 to the display 150, as shown in state 823. For example, the display control module 170 may output the movement item 812D_1 at a position corresponding to a drag event. Additionally, when a touch event relating to the movement item 812D_1 is released, the display control module 170 may display guide information 810D_3 corresponding to the size of a split window to be output. The guide information 810D_3, for example, may be a specified image or shadow processed area corresponding to the item 812D.

According to an embodiment of the present disclosure, when at least part of the movement item 812D_1 overlaps a boundary area (e.g., a top boundary area) of the guide information 810D_3, as shown in state 825, the display control module 170 may support to adjust the size of a split window relating to the movement item 812D_1. According to an embodiment of the present disclosure, when the movement item 812D_1 overlaps the boundary area of the guide information 810D_3, the display control module 170 may indicate that a split window size adjustment is possible by displaying highlighting or text.

According to an embodiment of the present disclosure, when the movement item 812D_1 overlapping the boundary area of the guide information 810D_3 moves toward the bottom of the display 150, as shown in state 827, the display control module 170 may output the size-adjusted (e.g., reduced) guide information 812D_4 according thereto. According to an embodiment of the present disclosure, when the movement item 812D_1 overlapping the boundary area of the guide information 810D_3 moves toward the top of the display 150, the display control module 170 may output the size-increased guide information according thereto.

As the size-adjusted guide information 810D_4 is set, when a specified event (e.g., a touch release event) relating to the movement item 812D_1 occurs, the display control module 170 may output a split window 812D_5 corresponding to the size of the guide information 810D_4, as shown in state 829. In relation to this, the display control module 170 may change the window 810c in full screen into the size-adjusted window 810c_3.

Figure 9:
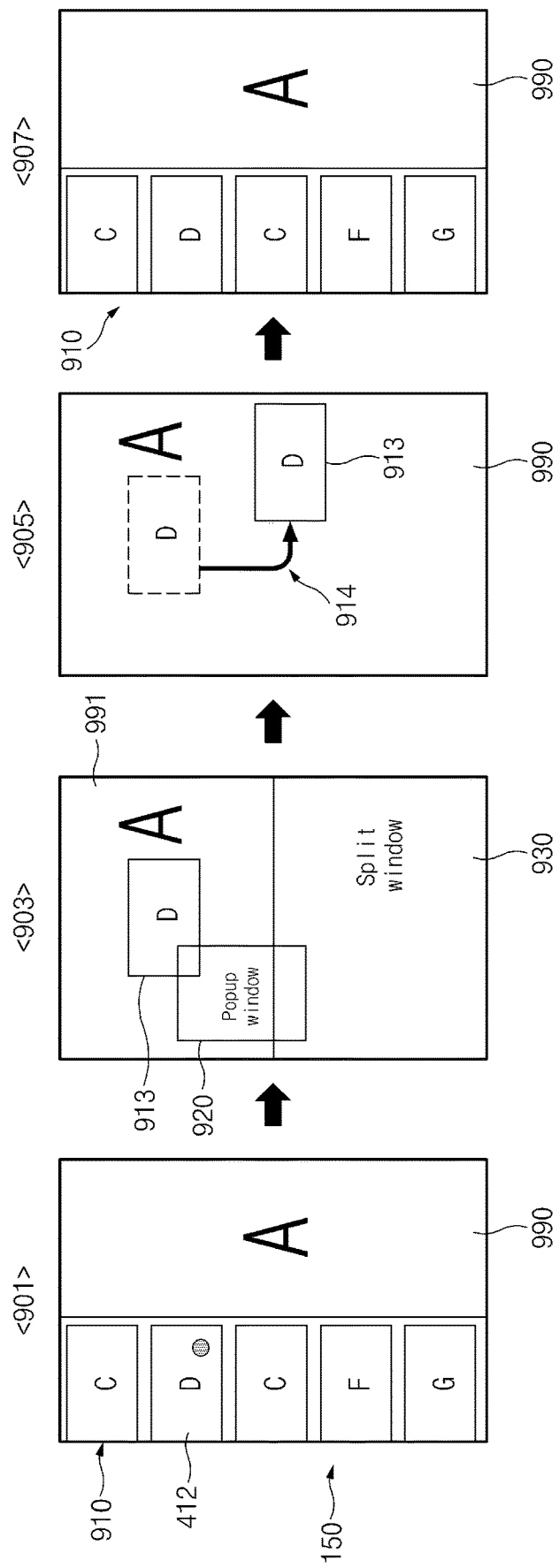
FIG. 9 is a diagram illustrating a multi window execution cancellation function according to an embodiment of the present disclosure.

FIG. 9 is a diagram illustrating a multi window execution cancellation function according to an embodiment of the present disclosure.

Referring to FIG. 9, as shown in state 901, the display control module 170 may output a window 990, including a window tray 910, to the display 150. When an item 912 of the window tray 910 is selected, the display control module 170 may output guide information 920 and 930 corresponding to the selection of the item 912, as shown in state 903. Alternatively, when the item 921 is selected and then moved by a specified distance, the display control module 170 may output the guide information 920 and 930. Additionally, the display control module 170 may output a movement item 913 corresponding to a movement of the item 912. The display control module 170 may output a window 991 obtained by changing the window 990 according to the output of the guide information 930. During this operation, the movement item 913 may be specified by a user's touch motion (e.g., by being dragged).

According to an embodiment of the present disclosure, the display control module 170 may receive a specified touch event 914 (e.g., a swap event in a predetermined direction) in relation to the movement item 913, as shown in state 905. When the specified touch event 914 is received, the display control module 170 may cancel a window output relating to the selected item 912. For example, when the specified touch event 914 is received, the display control module 170 may remove the guide information 920 and 930 from the window 990. According to an embodiment of the present disclosure, when the specified touch event 914 is received, the display control module 170 may return to a state before the selection of the item 912, as shown in state 907. For example, the display control module 170 may output the window tray 910 on the window 990. The display control module 170 may remove the movement item 913 according to the reception of the specified event 914.

Figure 10:
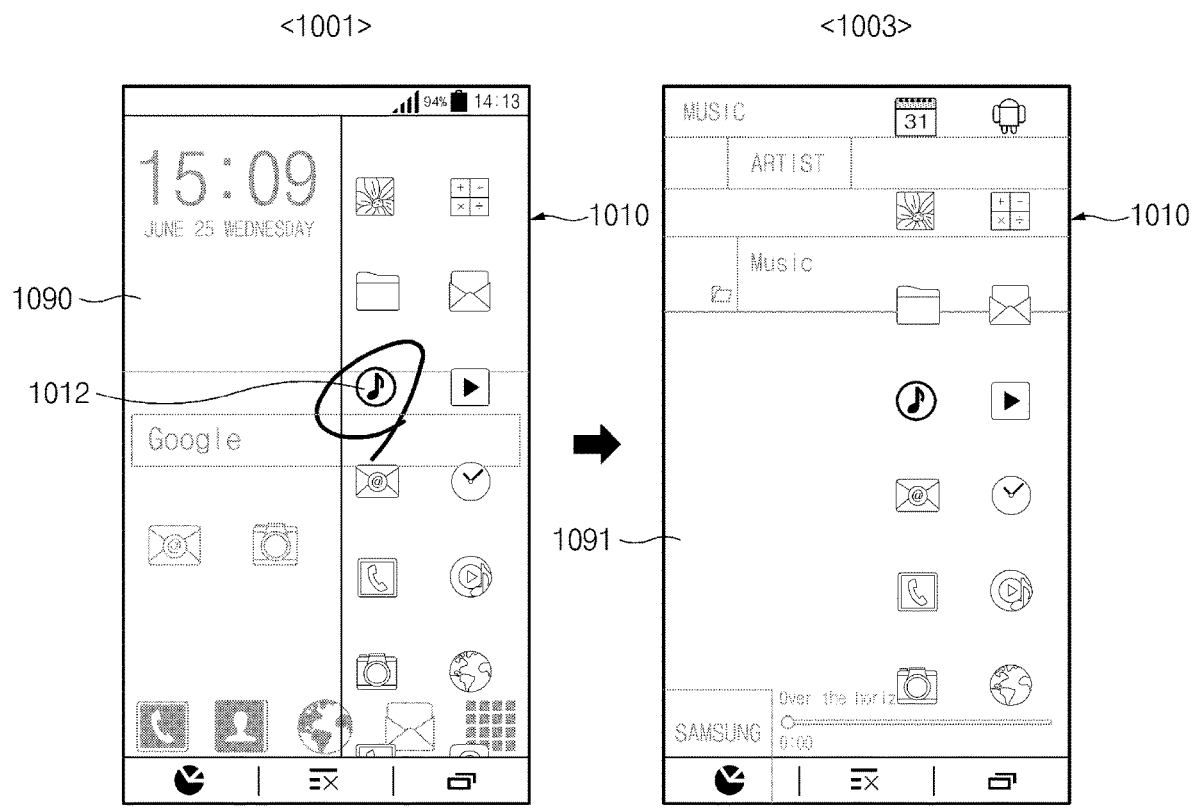
FIG. 10 is a flowchart illustrating a window tray management according to an embodiment of the present disclosure.

FIG. 10 is a flowchart illustrating a window tray management according to an embodiment of the present disclosure.

Referring to FIG. 10, corresponding to an occurrence of an input event, the display control module 170 may output a window tray 1010 on a window 1090, as shown in state 1001. According to an embodiment of the present disclosure, the window 1090 may be a standby screen or home screen window. When an item 1012 is selected on the window tray 1010, the display control module 170 may output a window 1091 relating to the item 1012 to the display 150, as shown in state 1003. During this operation, the display control module 170 may remove the window 1090 and may output the window 1091 relating to the item 1012 to the display 150 in full screen.

According to an embodiment of the present disclosure, the display control module 170 may control the maintenance or removal of the window tray 1010 according to the item 1012. For example, when the window 1091 executed by the item 1012 supports a multi window, the display control module 170 may maintain the output of the window tray 1010 as shown in state 1003. According to an embodiment of the present disclosure, when the item 1012 provides a window corresponding to the execution of an application not supporting a multi window, the display control module 170 may remove the window tray 1010 from the display 150. Alternatively, when the window 1090 does not support a multi window, even if an event relating to the call of the window tray 1010 occurs, the display control module 170 may perform a control not to output the window tray 1010. Additionally, the display control module 170 may notify a state of not providing a multi window.

According to an embodiment of the present disclosure, the display control module 170 may process an output window form differently (or distinctively) output according to an item selection method. For example, when a first event (e.g., an event by a tap touch) occurs in relation to the item 1012, as shown in FIG. 10, the display control module 170 may output a window for the item 1012 to the display 150 in full screen. According to an embodiment of the present disclosure, when a second event (e.g., an event by a long press) occurs in relation to the item 1012, the display control module 170, as described above, may output a specified window form (e.g., at least one of a split window, a pop-up window, and a widget window) in relation to a corresponding window. For example, according to an event method (e.g., a tap, a swap, a long press, or a specified gesture method) under an environment in which a window corresponding to a specific function execution is output as the background of a window tray, the display control module 170 may support to output a specified window form corresponding to an event type under a multi window environment in which a plurality of windows are placed or output one window in full screen.

As mentioned above, according to an embodiment of the present disclosure, a window management method may include receiving an event relating to the selection of a displayed item and differently (e.g., when a window is output, outputting a window form, whose output is available under an environment in which a plurality of windows are output, as a specified form) processing a multi window form of an output capable window in relation to the selected item according to the event.

According to an embodiment of the present disclosure, receiving the event may include outputting a window tray or recent execution list including at least one item according to an input event occurrence and receiving an event relating to the selection of an item included in the window tray or recent execution list.

According to an embodiment of the present disclosure, the method may further include outputting a window relating to the item as at least one of a pop-up window, a split window, and a widget window corresponding to a movement area of the selected item.

According to an embodiment of the present disclosure, the method may further include displaying guide information of an output capable at least one window form in relation to the selected item.

According to an embodiment of the present disclosure, the method may further include removing the guide information corresponding to a specified event occurrence.

According to an embodiment of the present disclosure, the method may further include displaying guide information of an output capable window form according to a movement area of the selected item.

According to an embodiment of the present disclosure, the method may further include receiving a specified event occurrence while the selected item is placed on guide information, executing an application relating to the selected item according to the specified event occurrence, and outputting a window including information corresponding to the application execution in a window form corresponding to the guide information.

According to an embodiment of the present disclosure, the outputting of the window may include outputting a window relating to the item as at least one of a pop-up window, a split window, and a widget window corresponding to the guide information of the moved position.

According to an embodiment of the present disclosure, the method may further include outputting at least one item including at least one virtual button relating to at least one multi window form.

According to an embodiment of the present disclosure, the method may further include differently outputting a window form corresponding to the type of a selected virtual button.

According to an embodiment of the present disclosure, the method may further include adjusting at least one of the form and size of an output capable window corresponding to the event type.

Figure 11:
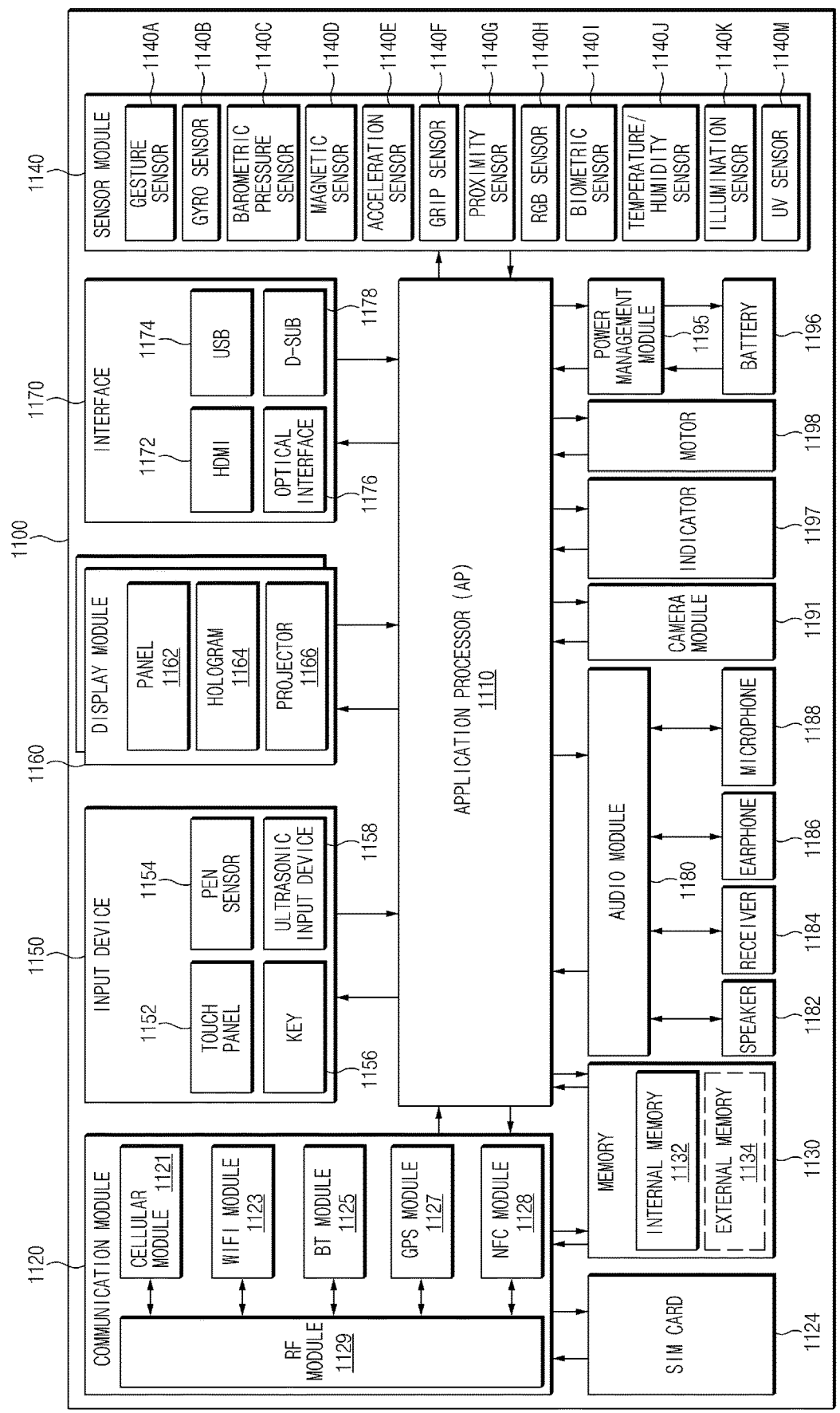
FIG. 11 is a diagram illustrating an electronic device for supporting a multi window function according to an embodiment of the present disclosure.

FIG. 11 is a diagram illustrating an electronic device for supporting a multi window function according to an embodiment of the present disclosure.

Referring to FIG. 11, the electronic device 1100, for example, may include all or part of the above-mentioned electronic device 100 shown in FIG. 1. The electronic device 1100 includes application processor (AP) 1110, a communication module 1120, a subscriber identification module (SIM) card 1124, a memory 1130, a sensor module 1140, an input device 1150, a display 1160, an interface 1170, an audio module 1180, a camera module 1191, a power management module 1195, a battery 1196, an indicator 1197, and a motor 1198.

The AP 1110 controls a plurality of hardware or software components connected to the AP 1110 and also performs various data processing and operations by executing an operating system or an application program. The AP 1110 may be implemented with a system on chip (SoC), for example. According to an embodiment of the present disclosure, the AP 1110 may further include a graphic processing unit (GPU) (not shown) and/or an image signal processor. The AP 1110 may include at least part (e.g., the cellular module 1121) of components shown in FIG. 11. The AP 1110 may load commands or data received from at least one of other components (e.g., nonvolatile memory) and process them and may store various data in a nonvolatile memory.

The communication module 1120 may have the same or similar configuration as the communication interface 160 of FIG. 1. The communication module 1120 includes a cellular module 1121, a WiFi module 1123, a Bluetooth (BT) module 1125, a global positioning system (GPS) module 1127, a near field communication (NFC) module 1128, and a radio frequency (RF) module 1129.

The cellular module 1121, for example, may provide voice call, video call, text service, or internet service through a communication network. According to an embodiment of the present disclosure, the cellular module 1121 may perform an identification and authentication operation on an electronic device 1100 in a communication network by using a subscriber identification module (e.g., the SIM card 1124). According to an embodiment of the present disclosure, the cellular module 1121 may perform at least part of a function provided by the AP 1110. According to an embodiment of the present disclosure, the cellular module 1121 may further include a communication processor (CP).

Each of the WiFi module 1123, the BT module 1125, the GPS module 1127, and the NFC module 1128 may include a processor for processing data transmitted/received through a corresponding module. According to an embodiment of the present disclosure, at least part (e.g., at least one) of the WiFi module 1121, the BT module 1123, the GPS module 1125, and the NFC module 1127 may be included in one integrated chip (IC) or IC package.

The RF module 1129, for example, may transmit/receive communication signals (e.g., RF signals). The RF module 1129, for example, may include a transceiver, a power amp module (PAM), a frequency filter, a low noise amplifier (LNA), or an antenna. According to another embodiment of the present disclosure, at least one of the cellular module 1121, the WiFi module 1123, the BT module 1125, the GPS module 1127, and the NFC module 1128 may transmit/receive RF signals through a separate RF module.

The SIM card 1124 may include a card including a SIM and/or an embedded SIM and also may include unique identification information (e.g., an integrated circuit card identifier (ICCID)) or subscriber information (e.g., an international mobile subscriber identity (IMSI)).

The memory 1130 (e.g., the memory 130) may include an internal memory 1132 or an external memory 1134. The internal memory 1132 may include at least one of a volatile memory (e.g., dynamic random access memory (RAM) (DRAM), static RAM (SRAM), synchronous dynamic RAM (SDRAM)) and a non-volatile memory (e.g., one time programmable ROM (OTPROM), programmable ROM (PROM), erasable and programmable ROM (EPROM), electrically erasable and programmable ROM (EEPROM), mask ROM, flash ROM, NAND flash memory, and NOR flash memory).

The external memory 1134 may further include flash drive, for example, compact flash (CF), secure digital (SD), micro Micro-SD, Mini-SD, extreme digital (xD), or a memory stick. The external memory 1134 may be functionally and/or physically connected to the electronic device 1100 through various interfaces.

The sensor module 1140 measures physical quantities or detects an operating state of the electronic device 1100, thereby converting the measured or detected information into electrical signals. The sensor module 1140 includes a gesture sensor 1140A, a gyro sensor 1140B, a barometric pressure sensor 1140C, a magnetic sensor 1140D, an acceleration sensor 1140E, a grip sensor 1140F, a proximity sensor 1140G, a color sensor 1140H (e.g., a red, green, blue (RGB) sensor), a biometric sensor 1140I, a temperature/humidity sensor 1140J, an illumination sensor 1140K, and an ultra violet (UV) sensor 1140M. Additionally or alternatively, the sensor module 1140 may include an E-nose sensor, an electromyography (EMG) sensor, an electroencephalogram (EEG) sensor, an electrocardiogram (ECG) sensor, an infra red (IR) sensor, an iris sensor, or a fingerprint sensor. The sensor module 1140 may further include a control circuit for controlling at least one sensor therein. According to an embodiment of the present disclosure, the electronic device 1100 may further include a processor configured to control the sensor module 1140 as part of or separately from the AP 1110 and thus may control the sensor module 1140 while the AP 1110 is in a sleep state.

The input device 1150 includes a touch panel 1152, a (digital) pen sensor 1154, a key 1156, or an ultrasonic input device 1158. The touch panel 1152 may use at least one of capacitive, resistive, infrared, or ultrasonic methods, for example. Additionally, the touch panel 1152 may further include a control circuit. The touch panel 1152 may further include a tactile layer to provide tactile response to a user.

The (digital) pen sensor 1154, for example, may include a sheet for recognition as part of a touch panel or a separate sheet for recognition. The key 1156 may include a physical button, an optical key, or a keypad, for example. The ultrasonic input device 1158 checks data by detecting sound waves through a microphone (e.g., a microphone 1188) in the electronic device 1100 through an input tool generating ultrasonic signals.

The display 1160 (e.g., the display 150) includes a panel 1162, a hologram device 1164, and a projector 1166. The panel 1162 may have the same or similar configuration as the display 150 of FIG. 1. The panel 1162 may be implemented to be flexible, transparent, or wearable, for example. The panel 1162 and the touch panel 1152 may be configured with one module. The hologram 1164 may show three-dimensional images in the air by using the interference of light. The projector 1166 may display an image by projecting light on a screen. The screen, for example, may be placed inside or outside the electronic device 1100. According to an embodiment of the present disclosure, the display 1160 may further include a control circuit for controlling the panel 1162, the hologram device 1164, or the projector 1166.

The interface 1170 includes a high-definition multimedia interface (HDMI) 1172, a universal serial bus (USB) 1174, an optical interface 1176, or a D-subminiature (sub) 1178, for example. The interface 1170, for example, may be included in the communication interface 160 shown in FIG. 1. Additionally or alternately, the interface 1170 may include a mobile high-definition link (MHL) interface, a secure Digital (SD) card/multi-media card (MMC) interface, or an infrared data association (IrDA) standard interface.

The audio module 1180 converts sound into electrical signals and converts electrical signals into sounds. At least some components of the audio module 1180, for example, may be included in the input/output interface 180 shown in FIG. 1. The audio module 1180 processes sound information inputted/output through a speaker 1182, a receiver 1184, an earphone 1186, or a microphone 1188.

The camera module 1191, as a device for capturing still images and video, includes at least one image sensor (e.g., a front sensor or a rear sensor), a lens (not shown), an image signal processor (ISP) (not shown), or a flash (not shown) (e.g., an LED or a xenon lamp).

The power management module 1195 manages the power of the electronic device 1100. Although not shown in the drawings, the power management module 1195 may include a power management IC (PMIC), a charger IC, or a battery or fuel gauge, for example. The PMIC may have a wired and/or wireless charging method. As the wireless charging method, for example, there is a magnetic resonance method, a magnetic induction method, or an electromagnetic method. An additional circuit for wireless charging, for example, a circuit such as a coil loop, a resonant circuit, or a rectifier circuit, may be added. The battery gauge may measure the remaining amount of the battery 1196, or a voltage, current, or temperature thereof during charging. The battery 1196, for example, may include a rechargeable battery and/or a solar battery.

The indicator 1197 displays a specific state of the electronic device 1100 or part thereof (e.g., the AP 1110), for example, a booting state, a message state, or a charging state. The motor 1198 converts electrical signals into mechanical vibration and may generate vibration or haptic effect. Although not shown in the drawings, the electronic device 1100 may include a processing device (e.g., a GPU) for mobile TV support. A processing device for mobile TV support may process media data corresponding to the standards such as digital multimedia broadcasting (DMB), digital video broadcasting (DVB), or media flow.

Each of the above-mentioned components of the electronic device according to an embodiment of the present disclosure may be configured with at least one component and the name of a corresponding component may vary corresponding to the kind of an electronic device. According to an embodiment of the present disclosure, an electronic device according to an embodiment of the present disclosure may include at least one of the above-mentioned components, may not include some of the above-mentioned components, or may further include another component. Additionally, some of components in an electronic device according to an embodiment of the present disclosure are configured as one entity, so that functions of previous corresponding components are performed identically.

Figure 12:
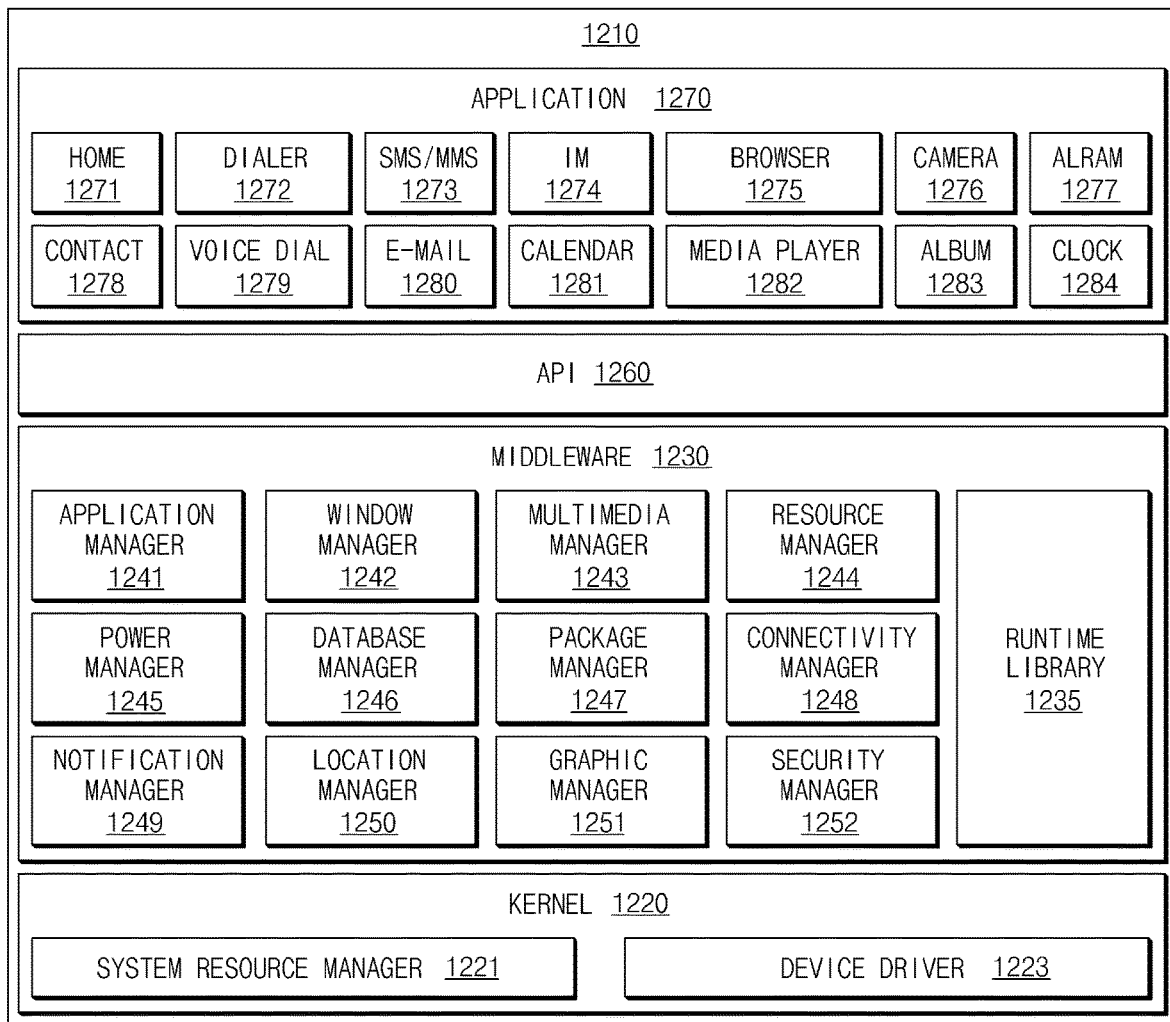
FIG. 12 is a block diagram illustrating a program module according to an embodiment of the present disclosure.

FIG. 12 is a block diagram illustrating a program module according to an embodiment of the present disclosure.

Referring to FIG. 12, according to an embodiment of the present disclosure, the program module 1210 may include an operating system (OS) for controlling a resource relating to an electronic device (e.g., the electronic device 100) and/or various applications running on the OS. The OS, for example, may include android, iOS, windows, symbian, tizen, or bada.

The program module 1210 includes an OS and an application 1270. The OS may include a kernel 1220, a middleware 1230, and an API 1260. At least part of the program module 1210 may be preloaded on an electronic device or may be downloaded from a server (e.g., 104).

The kernel 1220, for example, includes a system resource manager 1221 or a device driver 1223. The system resource manager 1221 performs the control, allocation, or retrieval of system resources. According to an embodiment of the disclosure, the system resource manager 1221 may include a process management unit, a memory management unit, or a file system management unit. The device driver 1223, for example, a display driver, a camera driver, a Bluetooth driver, a sharing memory driver, a USB driver, a keypad driver, a WiFi driver, an audio driver, or an inter-process communication (IPC) driver.

The middleware 1230, for example, may provide a function that is commonly required by the application 1270, or may provide various functions to the application 1270 through the API 1260, in order to allow the application 1270 to efficiently use a limited system resource inside the electronic device. According to an embodiment of the disclosure, the middleware 1230 includes a runtime library 1235, an application manager 1241, a window manager 1242, a multimedia manager 1243, a resource manager 1244, a power manager 1245, a database manager 1246, a package manager 1247, a connectivity manager 1248, a notification manager 1249, a location manager 1250, a graphic manager 1251, and a security manager 1252.

The runtime library 1235, for example, may include a library module that a complier uses to add a new function through a programming language while the application 1270 is running. The runtime library 1235 performs a function on input/output management, memory management, or an arithmetic function.

The application manager 1241, for example, manages the life cycle of at least one application among the applications 1270. The window manager 1242 manages a GUI resource used in a screen. The multimedia manager 1243 recognizes a format for playing various media files and may encode or decode a media file by using the codec corresponding to a corresponding format. The resource manager 1244 manages a resource, such as a source code, a memory, or a storage space of at least any one of the applications 1270.

The power manager 1245, for example, operates together with a basic input/output system (BIOS) to manage the battery or power and may provide power information necessary for an operation of the electronic device. The database manager 1246 creates, searches, or modifies a database used in at least one application among the applications 1270. The package manager 1247 manages the installation or update of an application distributed in a package file format.

The connectivity manger 1248 manages a wireless connection such as WiFi or Bluetooth. The notification manager 1249 displays or provides notification of events, such as arrival messages, appointments, and proximity alerts. The location manager 1250 manages location information on an electronic device. The graphic manager 1251 manages a graphic effect to be provided to a user or a user interface relating thereto. The security manager 1252 provides various security functions necessary for system security or user authentication. According to an embodiment of the present disclosure, when an electronic device (e.g., the electronic device 100) includes a phone function, the middleware 1230 may further include a telephony manager for managing a voice or video call function of the electronic device.

The middleware 1230 includes a middleware module for forming a combination of various functions of the above-mentioned components. The middleware 1230 provides a module specialized for each type of OS to provide differentiated functions. Additionally, the middleware 1230 may delete parts of existing components or dynamically add new components.

The API 1260, for example, as a set of API programming functions, may be provided as another configuration according to an OS. For example, in the case of Android or iOS, one API set may be provided for each platform and in the case Tizen, at least two API sets may be provided for each platform.

The application 1270, for example, includes at least one application for providing functions such as a home 1271, a dialer 1272, a short message service/multimedia messaging service (SMS/MMS) 1273, an instant message 1274, a browser 1275, a camera 1276, an alarm 1277, a contact 1278, a voice dial 1279, an e-mail 1280, a calendar 1281, a media player 1282, an album 1283, a clock 1284, health care (e.g., measure an exercise amount or blood sugar), or environmental information provision (e.g., provide air pressure, humidity, or temperature information).

According to an embodiment of the disclosure, the application 1270 may include an application (hereinafter referred to as "information exchange application") for supporting information exchange between the electronic device (e.g., the electronic device 100) and an external electronic device (e.g., the electronic device 102). The information exchange application, for example, may include a notification relay application for relaying specific information to the external device or a device management application for managing the external electronic device.

For example, the notification relay application may have a function for relaying to an external electronic device 102 notification information occurring from another application (e.g., an SMS/MMS application, an e-mail application, a health care application, or an environmental information application) of the electronic device. Additionally, the notification relay application may receive notification information from an external electronic device and may then provide the received notification information to a user. The device management application, for example, may manage (e.g., install, delete, or update) at least one function (turn-on/turn off of the external electronic device itself (or some components) or the brightness (or resolution) adjustment of a display) of an external electronic device 102 communicating with the electronic device, an application operating in the external electronic device, or a service (e.g., call service or message service) provided from the external device 102.

According to an embodiment of the disclosure, the application 1270 may include a specified application (e.g., a health care application) according to the property (e.g., as the property of an electronic device, when the type of the electronic device is a mobile medical device) of the external electronic device 102. According to an embodiment of the present disclosure, the application 1270 may include an application received from an external electronic device (e.g., the server 104 or the electronic device 102). According to an embodiment of the disclosure, the application 1270 may include a preloaded application or a third party application downloadable from a server. The names of components in the program module 1210 according to the shown embodiment may vary depending on the type of OS.

According to an embodiment of the present disclosure, at least part of the program module 1210 may be implemented with software, firmware, hardware, or a combination thereof. At least part of the programming module 1210, for example, may be implemented (e.g., executed) by a processor (e.g., the AP 1110). At least part of the programming module 1210 may include a module, a program, a routine, sets of instructions, or a process to perform at least one function, for example.

According to an embodiment of the present disclosure, at least one of the position and form of a window can be adjusted more intuitively and easily.

The term "module" used in an embodiment of the present disclosure, for example, may mean a unit including a combination of at least one of hardware, software, and firmware. The terms "module" and the term "unit", "logic", "logical block", "component", or "circuit" may be interchangeably used. A "module" may be a minimum unit or part of an integrally configured component. A "module" may be a minimum unit performing at least one function or part thereof. A "module" may be implemented mechanically or electronically. For example, "module" according to an embodiment of the present disclosure may include at least one of an application-specific integrated circuit (ASIC) chip performing certain operations, field-programmable gate arrays (FPGAs), or a programmable-logic device, all of which are known or to be developed in the future.

According to an embodiment of the present disclosure, at least part of a device (e.g., modules or functions thereof) or a method (e.g., operations) according to this disclosure, for example, as in a form of a programming module, may be implemented using an instruction stored in computer-readable storage media. When at least one processor (e.g., the processor 120) executes an instruction, it may perform a function corresponding to the instruction. The non-transitory computer-readable storage media may include the memory 130, for example.

The non-transitory computer-readable storage media may include hard disks, floppy disks, magnetic media (e.g., magnetic tape), optical media (e.g., compact disc (CD)-read only memory (ROM), and digital versatile disc (DVD)), magneto-optical media (e.g., floptical disk), and hardware devices (e.g., ROM, RAM, or flash memory). Additionally, a program instruction may include high-level language code executable by a computer using an interpreter in addition to machine code created by a complier. The hardware device may be configured to operate as at least one software module to perform an operation of an embodiment of the present disclosure and vice versa.

According to an embodiment of the present disclosure, the non-transitory computer-readable storage media may include at least one instruction executable by at least one processor and the at least one instruction may be set for receiving an event relating to the selection of a displayed item and differently (e.g., when a window is output, outputting a window form, whose output is available under an environment in which a plurality of windows are output, as a specified form) processing a multi window form of an output capable window in relation to the selected item according to the event.

A module or a programming module according to an embodiment of the present disclosure may include at least one of the above-mentioned components, may not include some of the above-mentioned components, or may further include another component.

Operations performed by a module, a programming module, or other components according to an embodiment of the present disclosure may be executed through a sequential, parallel, repetitive or heuristic method. Additionally, some operations may be executed in a different order or may be omitted, or other operations may be added.

Certain embodiments of the present disclosure have been shown and described. It will be understood by those skilled in the art that various changes in form and detail may be made therein without departing from the spirit and scope of the disclosure as defined by the appended claims and their equivalents.

What is claimed is:

1. An electronic device, comprising:
   a touchscreen display; and
   a processor configured to:
   display, on a display area of the touchscreen display, a first execution window of a first application,
   display, on the display area of the touchscreen display, an application tray including a plurality of user interface (UI) items for executing applications,
   receive a first user input selecting a UI item from among the plurality of UI items included in the application tray and dragging the selected UI item out of the application tray,
   in response to a position of the dragged selected UI, display guide information illustrating a form of a second execution window of a second application corresponding to the selected UI item, wherein the guide information includes manipulation information for outputting at least one of a pop-up window, a split window, or a widget window, and
   in response to the selected UI item being released on the guide information, display the second execution window in the form of at least one of the pop-up window, the split window, or the widget window corresponding to the manipulation information,
   wherein, in response to the selected UI item being released within a second portion of the display area, display the second execution window in the form of the pop-up window at least partially overlapping the first execution window, wherein the second portion is a portion where the first execution window is displayed, and
   wherein the manipulation information indicates an input method to display the second execution window as a desired form among at least one of the pop-up window, the split window, or the widget window.

2. The electronic device of claim 1, wherein, in response to the selected UI item being released within a first portion of the display area, display the second execution window in the form of the split window adjacent to the first execution window, wherein the first portion is an edge portion of the first execution window.

3. The electronic device of claim 2, wherein the processor is further configured to resize the first execution window and the second execution window in a multi window mode, in response to receiving a second user input dragging a dividing line between the first execution window and the second execution window.

4. The electronic device of claim 1, wherein the processor is further configured to display the first execution window and the second execution window side-by-side, in response to receiving a third user input.

5. The electronic device of claim 1, wherein the processor is further configured to remove the application tray, in response to displaying the second execution window.

6. The electronic device of claim 1, wherein the application tray is displayed in response to a touch swipe input from an edge of the touchscreen display towards a center of the touchscreen display.

7. The electronic device of claim 1, wherein the application tray is displayed at an edge of the touchscreen display.

8. A method for window management in an electronic device including a touchscreen display, the method comprising:
   displaying, on a display area of the touchscreen display, a first execution window of a first application;
   displaying, on the display area of the touchscreen display, an application tray including a plurality of user interface (UI) items for executing applications;
   receiving a first user input selecting a UI item from among the plurality of UI items included in the application tray and dragging the selected UI item out of the application tray;

in response to a position of the dragged selected UI item, displaying guide information illustrating a form of a second execution window of a second application corresponding to the selected UI item, wherein the guide information includes manipulation information for outputting at least one of a pop-up window, a split window, or a widget window; and in response to the selected UI item being released on the guide information, displaying the second execution window in the form of at least one of the pop-up window, the split window, or the widget window corresponding to the manipulation information, wherein displaying the second execution window comprises, in response to the selected UI item being released within a second portion of the display area, displaying the second execution window in the form of the pop-up window at least partially overlapping the first execution window, wherein the second portion is a portion where the first execution window is displayed, and wherein the manipulation information indicates an input method for displaying the second execution window as a desired form among at least one of the pop-up window, the split window, or the widget window.

9. The method of claim 8, wherein displaying the second execution window comprises, in response to the selected UI item being released within a first portion of the display area, displaying the second execution window in the form of the split window adjacent to the first execution window, and wherein the first portion is an edge portion of the first execution window.

10. The method of claim 9, further comprising resizing the first execution window and the second execution window in a multi window mode, in response to receiving a second user input dragging a dividing line between the first execution window and the second execution window.

11. The method of claim 8, further comprising displaying the first execution window and the second execution window side-by-side, in response to receiving a third user input.

12. The method of claim 8, further comprising removing the application tray, in response to displaying the second execution window.

13. The method of claim 8, wherein the application tray is displayed in response to receiving a touch swipe input from an edge of the touchscreen display towards a center of the touchscreen display.

14. The method of claim 8, wherein the application tray is displayed at an edge of the touchscreen display.

* * * * *